US012762658B2

(12) United States Patent
Wei et al.

(10) Patent No.: US 12,762,658 B2
(45) Date of Patent: Oct. 13, 2026

(54) METHOD FOR TRAINING LIGHT FILLING MODEL, IMAGE PROCESSING METHOD, AND RELATED DEVICE THEREOF

(71) Applicant: HONOR DEVICE CO., LTD., Shenzhen (CN)

(72) Inventors: Yi Wei, Shenzhen (CN); Liu Lu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 315 days.

(21) Appl. No.: 18/577,489

(22) PCT Filed: Dec. 28, 2022

(86) PCT No.: PCT/CN2022/142759
§ 371 (c)(1),
(2) Date: Jan. 8, 2024

(87) PCT Pub. No.: WO2023/160219
PCT Pub. Date: Aug. 31, 2023

(65) Prior Publication Data

US 2024/0331103 A1 Oct. 3, 2024

(30) Foreign Application Priority Data

Feb. 28, 2022 (CN) ........................ 202210193768.X

(51) Int. Cl.
*G06T 5/60* (2024.01)
*G06T 5/50* (2006.01)
(Continued)

(52) U.S. Cl.
CPC .................. *G06T 5/60* (2024.01); *G06T 5/50* (2013.01); *G06T 7/11* (2017.01); *G06T 7/30* (2017.01);
(Continued)

(58) Field of Classification Search
CPC ..... G06T 5/60; G06T 7/11; G06T 7/30; G06T 7/70
See application file for complete search history.

(56) References Cited

U.S. PATENT DOCUMENTS 11,776,095 B2 * 10/2023 Sun ........................... G06T 5/60 382/274
2023/0215132 A1 7/2023 Li et al.
2023/0351560 A1 11/2023 Jacobs et al.

FOREIGN PATENT DOCUMENTS

CN 107770454 A 3/2018
CN 107909640 A 4/2018
(Continued)

OTHER PUBLICATIONS

InnovationQ+ by IP.com and IEEE, Results Publication Date Range: Jan. 26, 2016 to Dec. 25, 2025.*
(Continued)

*Primary Examiner* — Quang N Vo
(74) *Attorney, Agent, or Firm* — WOMBLE BOND DICKINSON (US) LLP

(57) ABSTRACT

This application relates to the technical field of images, and provides a method for training a light filling model, an image processing method, and a related device thereof. The method includes: obtain an albedo portrait training image and a normal portrait training image; performing processing on the refined matte portrait training image, the plurality of frames of OLAT training images, and a panoramic environment image to obtain a to-be-light-filled composite rendered image and a light-filled composite rendered image; and training an initial light filling model by using the albedo portrait training image, the normal portrait training image, the to-be-light-filled composite rendered image, and the light-filled composite rendering image, to obtain a target light filling model. In this application, by using a deep
(Continued)

learning method, a portrait and an environment in a to-be-photographed scene are filled with light to improve sharpness and contrast of the portrait.

20 Claims, 13 Drawing Sheets

(51) Int. Cl.

| | |
|---|---|
| ***G06T 7/11*** | (2017.01) |
| ***G06T 7/30*** | (2017.01) |
| ***G06T 7/70*** | (2017.01) |
| ***H04N 23/698*** | (2023.01) |
| ***H04N 23/76*** | (2023.01) |

(52) U.S. Cl.
CPC ............ *G06T 7/70* (2017.01); *H04N 23/698* (2023.01); *H04N 23/76* (2023.01); *G06T 2207/20081* (2013.01); *G06T 2207/20132* (2013.01); *G06T 2207/20212* (2013.01); *G06T 2207/30201* (2013.01)

(56) References Cited

FOREIGN PATENT DOCUMENTS

| | | | | | |
|---|---|---|---|---|---|
| CN | 109040612 | A | | 12/2018 | |
| CN | 109120864 | A | | 1/2019 | |
| CN | 111144305 | A | | 5/2020 | |
| CN | 111144491 | A | | 5/2020 | |
| CN | 111784611 | A | | 10/2020 | |
| CN | 111835984 | A | | 10/2020 | |
| CN | 112258622 | A | | 1/2021 | |
| CN | 112703528 | A | | 4/2021 | |
| CN | 112906529 | A | | 6/2021 | |
| CN | 113034670 | A | | 6/2021 | |
| CN | 113222846 | A | | 8/2021 | |
| CN | 113240622 | A | | 8/2021 | |
| CN | 113542580 | A | | 10/2021 | |
| CN | 113554739 | A | | 10/2021 | |
| CN | 113592998 | A | | 11/2021 | |
| CN | 113661496 | A | | 11/2021 | |
| CN | 113824884 | A | | 12/2021 | |
| CN | 114207669 | A | | 3/2022 | |
| CN | 113240622 | B | | 1/2023 | |
| WO | 2021133375 | A1 | | 7/2021 | |
| WO | 2022002032 | A1 | | 1/2022 | |
| WO | WO-2022231582 | A1 | * | 11/2022 | ............ H04N 5/272 |

OTHER PUBLICATIONS

InnovationQ+ by IP.com and IEEE, Results Publication Date Range: Nov. 4, 2021 to Mar. 19, 2026.*

Zhou Hao et al: "Deep Single-Image Portrait Relighting", 2019 IEEE/CVF International Conference on Computer Vision (ICCV), IEEE, Oct. 27, 2019 (Oct. 27, 2019), pp. 7193-7201.

Pandey Rohit Rohitpandey@Google Com et al: "Total Relighting: Learning to Relight Portraits for Background Replacement", ACM Transactions on Graphics, ACM, NY, US, vol. 40, No. 4, Jul. 19, 2021 (Jul. 19, 2021), pp. 1-21.

Farshad Einabadi, et al: "Deep Neural Models for Illumination Estimation and Relighting: A Survey", Computer Graphics Forum, vol. 40 (2021), No. 6, pp. 315-331.

* cited by examiner

METHOD FOR TRAINING LIGHT FILLING MODEL, IMAGE PROCESSING METHOD, AND RELATED DEVICE THEREOF

CROSS-REFERENCE TO RELATED APPLICATIONS

This application is a national stage of International Application No. PCT/CN2022/142759, filed on Dec. 28, 2022, which claims priority to Chinese Patent Application No. 202210193768.X, filed on Feb. 28, 2022. The disclosures of both of the aforementioned applications are hereby incorporated by reference in their entireties.

TECHNICAL FIELD

This application relates to the field of image technologies, and in particular, to a method for training a light filling model, an image processing method, and a related device thereof.

BACKGROUND

Photography is an art of light and shadow. When photographing is performed in an outdoor environment, natural light can more realistically record a real-time light effect of a photographed scene, but the light cannot appear in every part that requires to be illuminated. As a result, shadows are cast at some angles or some regions become dark light regions. For example, when a portrait close-up is photographed with backlight or side backlight under strong sunlight, surrounding light is strong, a portrait region becomes a dark light region, and the details cannot be seen clearly.

In this regard, if a professional photographer performs photographing, light is filled by using an external artificial light source such as an external flash or spotlight, which can make full use of light and shadow effects to capture more tense portrait photos while reducing an influence of ambient light.

However, for an ordinary user who uses a mobile phone and another electronic device to perform photographing more in the daily lives, it is impossible to build such a professional external light filling scene in order to capture photos, which is neither realistic nor necessary. Based on the above, how to break a hardware limitation and help the electronic device such as the mobile phone through a calculation method, to enable the ordinary user to capture a portrait photo that is comparable to a portrait photo that is captured by the professional photographer under a light effect in a professional photographing site has become a research hotspot in graphics and major manufacturers.

SUMMARY

This application provides a method for training a light filling model, an image processing method, and a related device thereof. By using a deep learning method, combined with a lighting condition of tan ambient light in a to-be-photographed scene, a head posture, a normal direction, and an albedo of a to-be-photographed portrait, the portrait and the environment in the photographed site are filled with light to improve a portrait sharpness and a contrast.

To achieve the foregoing objective, the following technical solutions are used in this application.

According to a first aspect, a method for training a light filling model is provided, and the method includes:

obtaining a plurality of frames of initial portrait training images and a panoramic environment image;

performing first processing on the plurality of frames of initial portrait training images to obtain a refined matte portrait training image and a plurality of frames of OLAT (one light at a time) training images;

performing second processing on the refined matte portrait training image and the plurality of frames of OLAT training images to obtain an albedo portrait training image and a normal portrait training image;

performing third processing on the refined matte portrait training image, the plurality of frames of OLAT training images, and the panoramic environment image to obtain a to-be-light-filled composite rendered image and a light-filled composite rendered image; and training an initial light filling model by using the albedo portrait training image, the normal portrait training image, the to-be-light-filled composite rendered image, and the light-filled composite rendered image, to obtain a target light filling model, where the initial light filling model includes an initial inverse rendering sub-model, a to-be-light-filled position estimation module, and an initial light filling control sub-model; and the target light filling model includes a target inverse rendering sub-model, the to-be-light-filled position estimation module, and a target light filling control sub-model.

Embodiments of this application provide a method for training a light filling model. In the training process, a new method of constructing data is used for constructing a more realistic training image to train an initial light filling model, thereby improving the processing effect of the obtained target light filling model.

In a first possible implementation of the first aspect, the performing first processing on the plurality of frames of initial portrait training images to obtain a refined matte portrait training image and a plurality of frames of OLAT training images includes:

registering a plurality of frames of normal portrait training images with a fully lit portrait training image to obtain the plurality of frames of OLAT training images, where the plurality of frames of initial portrait training images include the plurality of frames of normal portrait training images, the fully lit portrait training image, a matte portrait training image, and an empty portrait training image;

registering the matte portrait training image with the fully lit portrait training image to obtain a registered matte portrait training image; and dividing the registered matte portrait training image by the empty portrait training image to obtain the refined matte portrait training image.

In the implementation, by obtaining the matte portrait training image and the empty portrait training image, the refined matte portrait training image is obtained by dividing in this application, so that the portrait and the background environment can be more finely distinguished and processed based on the refined matte portrait training image.

In a first possible implementation of the first aspect, the performing second processing on the refined matte portrait training image and the plurality of frames of OLAT training images to obtain an albedo portrait training image and a normal portrait training image includes:

multiplying the plurality of frames of OLAT training images by the refined matte portrait training image to obtain a plurality of frames of OLAT intermediate images; and determining, based on the plurality of frames of OLAT intermediate images, the albedo portrait training image and the normal portrait training image by using a photometric stereo formula.

In the implementation, this application uses the photometric stereo formula to solve the albedo and normal vector at the corresponding pixel position based on the plurality of frames of OLAT training images, so that the albedo portrait training image representing the portrait albedo information and the normal portrait training image representing the portrait normal information can be constructed, so as to be provided to the model training stage for model training.

In a first possible implementation of the first aspect, the performing third processing on the refined matte portrait training image, the plurality of frames of OLAT training images, and the panoramic environment image to obtain a to-be-light-filled composite rendered image includes:

determining an annotated panoramic environment image based on the plurality of frames of OLAT training images and the panoramic environment image, where the annotated panoramic environment image is annotated with a position of a light source corresponding to each of the plurality of frames of OLAT training images;

dividing the annotated panoramic environment image into regions based on the position of the light source by using a delaunay algorithm;

determining a weight corresponding to each region in the annotated panoramic environment image;

determining the to-be-light-filled portrait rendering image based on the plurality of frames of OLAT training images and the weight corresponding to each region in the annotated panoramic environment image; and obtaining the to-be-light-filled composite rendered image based on the panoramic environment image and the to-be-light-filled portrait rendering image.

It should be understood that the regions divided in the annotated panoramic environment image correspond one-to-one with the OLAT training image, or one-to-one with the light source corresponding to the OLAT training image.

In the implementation, this application determines the annotated panoramic environment image showing the position of the light source according to the OLAT training image and the panoramic environment image. Then, a weight corresponding to the region of each light source is determined from the annotated panoramic environment image, and the weight is used as the weight of each light source to composite the lighting condition of the environment, so that a weighted sum of the OLAT intermediate image can be calculated based on the weight to obtain the light and shadow effect achieved by the person under the lighting condition of the environment, that is, the to-be-light-filled portrait rendering image is obtained. Subsequently, based on the panoramic environment image and the to-be-light-filled portrait rendering image, the to-be-light-filled composite rendered image that can simultaneously represent the lighting condition of the environment and the light and shadow effect of the person in the environment can be obtained.

In a first possible implementation of the first aspect, the determining an annotated panoramic environment image based on the plurality of frames of OLAT training images and the panoramic environment image includes:

determining rectangular coordinates of the light source corresponding to each frame of OLAT training image based on the plurality of frames of OLAT training images;

converting the rectangular coordinates of the light source into polar coordinates; and annotating the position of the light source on the panoramic environment image based on the polar coordinates corresponding to the light source, to obtain the annotated panoramic environment image.

In the implementation, by converting the rectangular coordinates of the light source corresponding to the OLAT training image in this application, the polar coordinate positions of all light sources can be annotated in the panoramic environment image to obtain the annotated panoramic environment image.

In a first possible implementation of the first aspect, the determining the to-be-light-filled portrait rendering image based on the plurality of frames of OLAT training images and the weight corresponding to each region in the annotated panoramic environment image includes:

multiplying the plurality of frames of OLAT training images by the refined matte portrait training image to obtain the plurality of frames of OLAT intermediate images; and calculating a weighted sum of the plurality of frames of OLAT intermediate images by using the weight corresponding to each region in the annotated panoramic environment image, to obtain the to-be-light-filled portrait rendering image.

In the implementation, after a weighted sum of all the OLAT intermediate images and the corresponding weights are calculated in this application, the light and shadow effect corresponding to the portrait can be obtained in a complex lighting scene formed by all light sources presenting different levels of brightness in the environment shown in the annotated panoramic environment image.

In a first possible implementation of the first aspect, the obtaining the to-be-light-filled composite rendered image based on the panoramic environment image and the to-be-light-filled portrait rendering image includes:

cropping the panoramic environment image to obtain a local environment image; and compositing the to-be-light-filled portrait rendering image and the local environment image to obtain the to-be-light-filled composite rendered image.

In the implementation, after the panoramic environment image is cropped and composited with the to-be-light-filled portrait rendering image in this application, a to-be-light-filled composite rendered image that can simultaneously represent the lighting situation of the local environment where the portrait is located and the light and shadow effect of the person in the environment can be obtained.

In a first possible implementation of the first aspect, the performing third processing on the refined matte portrait training image, the plurality of frames of OLAT training images, and the panoramic environment image to obtain a light-filled composite rendered image includes:

determining a panoramic light-filled environment image based on the panoramic environment image;

determining an annotated panoramic light-filled environment image based on the plurality of frames of OLAT training images and the panoramic light-filled environment image, where the annotated panoramic light-filled environment image is annotated with a position of a light source corresponding to each of the plurality of frames of OLAT training images;

dividing the annotated panoramic light-filled environment image into regions based on the position of the light source by using a delaunay algorithm;

determining a weight corresponding to each region in the annotated panoramic light-filled environment image;

determining the light-filled portrait rendering image based on the plurality of frames of OLAT training images and the weight corresponding to each region in the annotated panoramic environment image; and obtaining the light-filled composite rendered image based on the panoramic light-filled environment image and the light-filled portrait rendering image.

It should be understood that the region divided in the annotated panoramic light-filled environment image correspond one-to-one with the OLAT training image, or one-to-one with the light source corresponding to the OLAT training image.

In the implementation, this application can simulate the environment after the light-filled by determining the panoramic light-filled environment image. In the implementation, this application determines the annotated panoramic light-filled environment image showing the position of the light source based on the plurality of frames of OLAT training images and the panoramic light-filled environment image. Then, a weight corresponding to the region of each light source is determined from the annotated panoramic environment image, and the weight is used as the weight of each light source to composite the lighting condition of the light filling environment, so that a weighted sum of the OLAT intermediate image can be calculated based on the weight to obtain the light and shadow effect achieved by the person under the lighting condition of the light filling environment, that is, the light-filled portrait rendering image is obtained. Subsequently, based on the panoramic light-filled environment image and the to-be-light-filled portrait rendering image, the to-be-light-filled composite rendered image that can simultaneously represent the lighting condition of the environment after the light-filled and the light and shadow effect of the person in the environment can be obtained.

In a first possible implementation of the first aspect, the determining a panoramic light-filled environment image based on the panoramic environment image includes:

obtaining a panoramic light-filled image; and superimposing the panoramic light-filled image and the panoramic environment image to obtain the panoramic light-filled environment image.

In the implementation, by superimposing the panoramic light-filled image and the panoramic environment image, this application can simulate the effect of the light filling on the environment, thereby obtaining the panoramic light-filled environment image.

In a first possible implementation of the first aspect, the determining an annotated panoramic light-filled environment image based on the plurality of frames of OLAT training images and the panoramic light-filled environment image includes:

determining rectangular coordinates of the light source corresponding to each frame of OLAT training image based on the plurality of frames of OLAT training images;

converting the rectangular coordinates of the light source into polar coordinates; and annotating the position of the light source on the panoramic light-filled environment image based on the polar coordinates corresponding to the light source, to obtain the annotated panoramic light-filled environment image.

In the implementation, by converting the rectangular coordinates of the light source corresponding to the OLAT training image in this application, the polar coordinate positions of all light sources can be annotated in the panoramic light-filled environment image to obtain the annotated panoramic light-filled environment image.

In a first possible implementation of the first aspect, the determining the light-filled portrait rendering image based on the plurality of frames of OLAT training images and the weight corresponding to each region in the annotated panoramic environment image includes:

multiplying the plurality of frames of OLAT training images by the refined matte portrait training image to obtain the plurality of frames of OLAT intermediate images; and calculating a weighted sum of the plurality of frames of OLAT intermediate images by using the weight corresponding to each region in the annotated panoramic light-filled environment image, to obtain the light-filled portrait rendering image.

In the implementation, after a weighted sum of all the OLAT intermediate images and the corresponding weights are calculated in this application, the light and shadow effect corresponding to the portrait can be obtained in a complex lighting scene formed by all light sources presenting different levels of brightness and light filling sources in the light filling environment shown in the annotated panoramic light-filled environment image.

In a first possible implementation of the first aspect, the obtaining the light-filled composite rendered image based on the panoramic light-filled environment image and the light-filled portrait rendering image includes:

cropping the panoramic light-filled environment image to obtain a local light-filled environment image; and compositing the light-filled portrait rendering image and the local light-filled environment image to obtain the light-filled composite rendered image.

In the implementation, after the panoramic light-filled environment image is cropped and composited with the to-be-light-filled portrait rendering image in this application, a light-filled composite rendered image with light representing the lighting condition of the light-filled environment and the light and shadow effect of the person in the light-filled environment can be obtained.

In a first possible implementation of the first aspect, the training an initial light filling model by using the albedo portrait training image, the normal portrait training image, the to-be-light-filled composite rendered image, and the light-filled composite rendered image, to obtain a target light filling model includes:

inputting the to-be-light-filled composite rendered image into the initial inverse rendering sub-model to obtain a first output image, a second output image, and a third output image;

comparing the first output image with the albedo portrait training image, comparing the second output image with the normal portrait training image, and comparing the third output image with the local environment image; and using a trained initial inverse rendering sub-model as the target inverse rendering sub-model if the first output image is similar to the albedo portrait training image, the second output image is similar to the normal portrait training image, and the third output image is similar to the local environment image.

The initial inverse rendering sub-model may be a U-net model.

In the implementation, the initial inverse rendering sub-model is trained by using the to-be-light-filled composite rendered image, the albedo portrait training image, the normal portrait training image, and the local environment image in this application, so that the target inverse rendering sub-model that can disassemble portrait albedo information, portrait normal direction information, and environmental information from complex images can be obtained.

In a first possible implementation of the first aspect, the method further includes:

- inputting the albedo portrait training image, the normal portrait training image, the local light-filled environment image, and the to-be-light-filled composite rendered image into the initial light filling control sub-model, to obtain a fourth output image;
- comparing the fourth output image with the light-filled composite rendered image; and
- using a trained initial light filling control sub-model as the target light filling control sub-model if the fourth output image is similar to the light-filled composite rendered image.

For example, the initial light filling control sub-model may be a U-net model.

In the implementation, the initial light filling control sub-model is trained by using the to-be-light-filled composite rendered image, the refined matte portrait training image, the albedo portrait training image, the normal portrait training image, the local light-filled environment image, and the light-filled composite rendered image in this application. In this way, the target light filling control sub-model that may fill the portrait with light can be obtained based on the light filling information in the light filling environment and using the portrait albedo information and the portrait normal direction information.

In a first possible implementation of the first aspect, the inputting the albedo portrait training image, the normal portrait training image, the local light-filled environment image, and the to-be-light-filled composite rendered image into the initial light filling control sub-model, to obtain a fourth output image includes:

- obtaining a light and shadow training image based on the normal portrait training image and the local light-filled environment image;
- multiplying the to-be-light-filled composite rendered image by the refined matte portrait training image to obtain a to-be-light-filled composite intermediate image; and
- inputting the albedo portrait training image, the normal portrait training image, the light and shadow training image, and the to-be-light-filled composite intermediate image into the initial light filling control sub-model to obtain the fourth output image.

In the implementation, by multiplying the to-be-light-filled composite rendered image and the refined matte portrait training image, a to-be-light-filled composite intermediate image having rich details can be obtained, and then the light-filled effect of the portrait can be improved in the future.

According to a second aspect, an apparatus for training a light filling model is provided. The apparatus includes units configured to perform each of the steps according to the first aspect or any possible implementation of the first aspect.

According to a third aspect, an image processing method is provided. The method includes: displaying a first interface, where the first interface includes a first control; detecting a first operation on the first control; obtaining an original image in response to the first operation; and processing the original image by using the target light filling model obtained according to the first aspect or any possible implementation of the first aspect, to obtain a captured image.

An embodiment of this application provides an image processing method. The target light filling model is configured to disassemble the portrait and environment information of the original image, then fill the environment with light, and then fill the portrait with light based on the light filling environment, so that both the person and the environment can be filled with light, and the captured image having a high definition and a strong contrast can be obtained.

According to a fourth aspect, image processing apparatus is provided. The apparatus includes units configured to perform each of the steps according to the third aspect or any possible implementation of the third aspect.

According to a fifth aspect, an electronic device including a processor and a memory is provided. The memory is configured to store a computer program executable on the processor; and the processor is configured to perform the method for training a light filling model according to the first aspect or any one of the possible implementations of the first aspect, and/or the image processing method according to the third aspect.

According to a sixth aspect, a chip is provided, including: a processor, configured to invoke a computer program from a memory and run the computer program to enable a device in which the chip is installed to perform the method for training a light filling model according to the first aspect or any one of the possible implementations of the first aspect, and/or the image processing method according to the third aspect.

According to a seventh aspect, a computer-readable storage medium is provided. The computer program includes program instructions, and when the program instructions are executed by a processor, the processor is enabled to perform the method for training a light filling model according to the first aspect or any one of the possible implementations of the first aspect, and/or the image processing method according to the third aspect.

According to an eighth aspect, a computer program product is provided. The computer program product includes a computer-readable storage medium storing computer instructions. The computer program causes a computer to perform the method for training a light filling model according to the first aspect or any one of the possible implementations of the first aspect, and/or the image processing method according to the third aspect.

DESCRIPTION OF EMBODIMENTS

Figure 1:
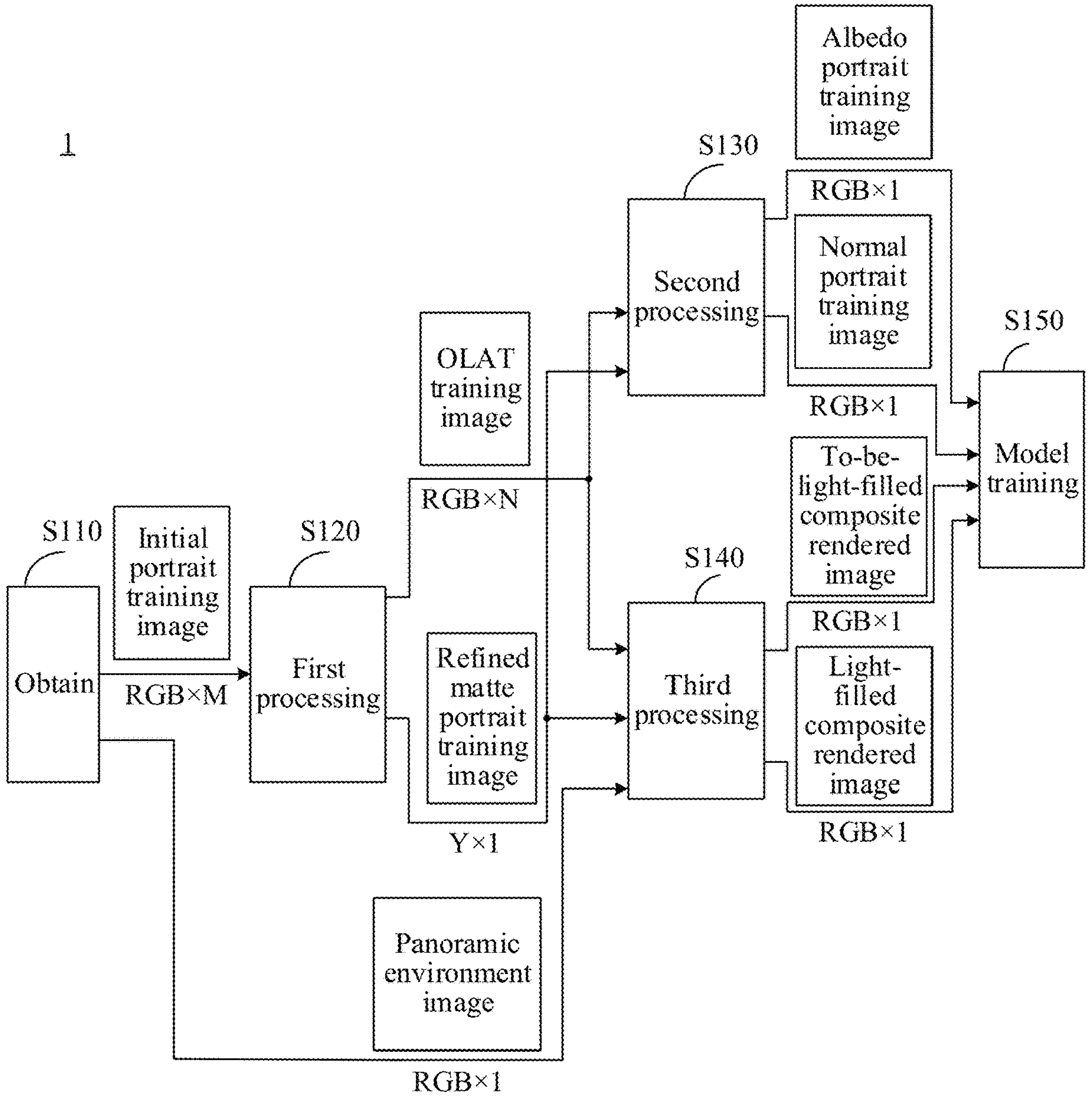
FIG. 1 is a flowchart of a method for training a light filling model according to an embodiment of this application.

The following describes technical solutions of this application with reference to the accompanying drawings.

In the descriptions of embodiments of this application, "/" means "or" unless otherwise specified. For example, A/B may represent A or B. In this specification, "and/or" describes only an association relationship for describing associated objects and indicates that three relationships may exist. For example, A and/or B may represent the following three cases: Only A exists, both A and B exist, and only B exists. In addition, in the descriptions of the embodiments of this application, "a plurality of" represents two or more.

The terms "first" and "second" mentioned below are used merely for the purpose of description, and shall not be construed as indicating or implying relative importance or implying a quantity of indicated technical features. Therefore, a feature limited by "first" or "second" may explicitly or implicitly include one or more of the features. In descriptions of embodiments of this embodiment, unless otherwise stated, "a plurality of" means two or more.

Firstly, some wordings in the embodiments of this application are explained for easy understanding by a person skilled in the art.

1. RGB (red, green, blue) color space or RGB domain refers to a color model related to a structure of a human visual system. Based on a structure of a human eye, all colors are treated as different combinations of red, green, and blue.

2. A pixel value refers to a set of color components corresponding to each pixel in a color image in the RGB color space. For example, each pixel corresponds to a set of three fundamental color components, where the three fundamental color components are respectively a red component R, a green component G, and a blue component B.

3. Backlighting is a condition in which a subject is right between a light source and a camera. In this state, a problem of insufficient exposure of the subject is easily caused. Therefore, under a normal circumstance, the user should try to avoid photographing the object under a backlight condition.

4. A high-speed camera focuses on a rapid camera action, which can capture hundreds of thousands or even millions of pictures per second.

5. Image registration (image registration) refers to matching of geographic coordinates of different images obtained by different imaging means in a same region. Geometric correction, projection transformation, and unified scale processing are included.

6. Albedo (albedo) usually refers to a ratio of a reflected radiation flux to an incident radiation flux on a surface under an influence of solar radiation. The Albedo is an important variable for inverting a plurality of surface parameters and reflects an absorption capacity of the surface to solar radiation.

In this application, the albedo refers to a ratio of the reflected radiation flux to the incident radiation flux of a portrait head under an irradiation of light, which is used for reflecting the absorption capacity of the portrait head surface such as a face and a scalp to the light radiation.

7. A normal direction is a direction of a normal line.

The above is a brief introduction to the terms as referred to in the embodiments of this application. Details are not described below again.

With the widespread use of electronic devices, using an electronic device to take a photo has become a daily behavior in people's lives. However, a mobile phone is used as an example. For an ordinary user who uses the mobile phones more for photographing, when a lighting condition of a to-be-photographed scene is not good, it is impossible to build such a professional external light filling scene in order to capture photos, which is neither realistic nor necessary. Based on the above, how to break a hardware limitation and help the electronic device such as the mobile phone through a calculation method, to enable the ordinary user to capture a portrait photo that is comparable to a portrait photo that is captured by the professional photographer in a professional photographed site has become a research hotspot in graphics and major manufacturers.

In order to resolve the above technical problems, some processing methods in the prior art are as follows. A camera screen is divided into a preview region and a light filling region, and the user manually selects the light filling region for filling light. This manner is not only inefficient, but also has a blunt light change and poor light filling effect.

Based on the above, embodiments of this application provide a method for training a light filling model and an image processing method. In the training process, a new method of constructing data is used for constructing a more realistic training image to train an initial light filling model, thereby improving the processing effect of the obtained target light filling model. However, in the image processing process, the light filling model is configured to disassemble an input image, analyze an albedo, a normal direction, and an environment corresponding to the portrait, and accurately evaluate a light filling position, so that the light filling can be performed more accurately, thereby improving a detail and a contrast of the output image, and generating a light filling result that is more in line with an actual environment.

With reference to the accompanying drawings in this specification, the light filling model provided by embodiments of this application and the method for training a light filling model are described in detail.

FIG. 1 is a flowchart of a method 1 for training a light filling model according to an embodiment of this application. As shown in FIG. 1, the method 1 for training a light filling model provided in this embodiment of this application includes five stages (S110 to S150), which respectively are a first stage to a fifth stage. The first stage is an obtaining stage, the second stage is a first processing stage, the third stage is a second processing stage, the fourth stage is a third processing stage, and the fifth stage is a model training stage.

S110: Obtain a plurality of frames of initial portrait training images and a panoramic environment image.

The plurality of frames of initial portrait training images include a plurality of frames of normal portrait training images, a fully lit portrait training image, a matte portrait training image, and an empty portrait training image.

The fully lit portrait training image refers to an image captured when all light sources are used to illuminate a portrait. The normal portrait training image refers to an image captured when some light sources are used to illuminate the portrait from a back of a non-portrait (from a front or a side of the portrait). Alight source position corresponding to each of the plurality of frames of normal portrait training images is different. "Normal" corresponds to "fully lit". When a quantity of light sources used to capture the fully lit portrait training image changes, the fully lit portrait training image changes. In this case, the normal portrait training image also changes accordingly.

The matte portrait training image refers to an image captured when the portrait in front of a grayscale plate is photographed with backlight. The empty portrait training image refers to an image captured when the grayscale plate is photographed with backlight. The grayscale plate may be understood as a mask and is a translucent material. Only a part of light passes through a region blocked by the grayscale plate, that is, the light is reduced. The matte portrait training image also corresponds to the empty portrait training image, and the difference is only that the portrait exists or not when the image is captured.

It should be noted that to collect the required plurality of frames of initial portrait training images, a lighting apparatus may be constructed. The lighting apparatus is a polyhedron similar to a sphere, for example, having 116 vertices. A light-emitting source is mounted at each vertex position to illuminate a center position of the polyhedron, and a to-be-photographed object is placed at the center position. The light-emitting source may be an LED light source, and the 116 LED light sources may emit light of different colors.

It should be understood that all a quantity of vertices of the polyhedron, a type of the set light-emitting source, and a color of the light source may be set as required, which are not limited in this embodiment of this application. In this embodiment of this application, an example in which there are the 116 LED light sources, and each light source emits white light is used for description, and details are not described again subsequently.

In this embodiment of this application, image data including a portrait needs to be constructed. Therefore, a to-be-photographed person may sit in the lighting apparatus and a head or an upper body of the to-be-photographed person is located at the center position of the polyhedron. Certainly, if a radius of the lighting apparatus is excessively large and the to-be-photographed person is excessively small relative to the lighting apparatus, an entire body of the to-be-photographed person may alternatively be located at the center position of the polyhedron, which is not limited in this embodiment of this application. It should be understood that the portrait in this embodiment of this application refers to the head, the upper body, or the entire body of the to-be-photographed person. The following uses the head of the to-be-photographed person as an example for description.

A camera faces the center position of the lighting apparatus and photographs the portrait at the center position of the lighting apparatus. A high-speed camera may be selected as the camera. The type and position of the camera and a quantity of cameras may be all configured and changed as required, which are not limited in this embodiment of this application. The high-speed camera at different positions captures an image, which can not only obtain more three-dimensional information, but also effectively solve a shadow cast (shadow cast) effect. In this embodiment of this application, one camera is used as an example for illustration, and the camera is located on a side facing the front of the portrait.

The lighting apparatus is also provided with a grayscale plate, which is a translucent material. The light-emitting source illuminates the grayscale plate and a part of light may pass through the grayscale plate. The grayscale plate is arranged on aback of the portrait, and a size of the grayscale plate is greater than a size of the portrait. It may be understood that the portrait is between the grayscale plate and the camera. When the camera photographs the portrait, the grayscale plate behind the portrait may also be photographed while photographing the portrait.

The lighting apparatus is further connected to a controller. The controller is configured to control operation conditions of the 116 light-emitting sources, or to control whether the 116 light-emitting sources emit light and a brightness degree of the emitted light.

In some embodiments, the controller may further detect a pose of the portrait at the center position of the polyhedron, and automatically adjust brightness of the light-emitting sources at different positions, to avoid overexposure or underexposure of a region of the illuminated portrait.

Combined with the lighting apparatus, the fully lit portrait training image refers to an image captured by the high-speed camera when all the light-emitting sources illuminate the portrait at the center position of the lighting apparatus.

The normal portrait training image refers to an image captured by the high-speed camera when one or more light-emitting sources (not all light-emitting sources, and not the light-emitting source behind the portrait) illuminate the portrait at the center position of the lighting apparatus. Positions of the light-emitting sources corresponding to the plurality of frames of normal portrait training images are different to simulate lighting conditions from different angles.

The matte portrait training image refers to an image captured by the high-speed camera with backlight when a plurality of light-emitting sources on the back of the grayscale plate are turned on, for example, six light-emitting sources on the back of the grayscale plate are turned on. The back of the grayscale plate refers to a side of the grayscale plate away from the camera.

The empty portrait training image refers to an image captured by the high-speed camera with backlight when the to-be photographed person leaves the lighting apparatus, that is, removing the portrait in the lighting apparatus, and then, only six light-emitting sources on the back of the grayscale plate are turned on.

For example, when the normal portrait training image is collected, only one light-emitting source may be turned on each time. The 116 light-emitting sources may be sequentially turned on, and 116 frames of normal portrait training images may be collected correspondingly.

It should be further noted that the panoramic environment image is used to indicate an image that can represent 360° all-round environmental information. By using a principle of spherical reflection of a metal ball, metal balls may be placed in different venues, and the panoramic environment image is obtained by photographing the metal balls by using the camera.

For example, the metal balls may be placed on an outdoor grass to reflect a surrounding environment including a blue sky and a grass, so that an outdoor panoramic environment image may be obtained by photographing the metal balls by using the camera.

For example, the metal balls may be placed at a center of a theater to reflect a surrounding environment including an auditorium and a stage, so that an interior panoramic environment image of the theater may be obtained by photographing the metal balls by using the camera.

It should be understood that in this application, the light-emitting sources at different positions illuminate the portrait, so that the plurality of frames of normal portrait training images for representing that the portrait is illuminated by different angles may be obtained, so as to facilitate subsequent simulation of input images that are illuminated by complex lighting from different directions during real processing.

In this application, a plurality of frames of panoramic environment images may be obtained, so as to facilitate subsequent simulation of different environments in which the portrait is located during real processing.

S120: Perform first processing on the plurality of frames of initial portrait training images to obtain a refined matte portrait training image and a plurality of frames of OLAT training images.

The plurality of frames of OLAT training images and the plurality of frames of normal portrait training images are in one-to-one correspondence.

S130: Perform second processing on the refined matte portrait training image and the plurality of frames of OLAT training images to obtain an albedo portrait training image and a normal portrait training image.

The albedo portrait training image is used to reflect albedo information of a portrait in the OLAT training image, and the normal portrait training image is used to reflect normal information of the portrait in the OLAT training image.

S140: Perform third processing on the refined matte portrait training image, the plurality of frames of OLAT training images, and the panoramic environment image to obtain a to-be-light-filled composite rendered image and a light-filled composite rendered image.

The to-be-light-filled composite rendered image is used to represent the portrait and an environment in which the portrait is located, and the light-filled composite rendered image is used to represent the portrait after the light filling and the environment after the light filling.

S150: Train an initial light filling model by using the albedo portrait training image, the normal portrait training image, the to-be-light-filled composite rendered image, and the light-filled composite rendered image to obtain a target light filling model.

Figure 2:
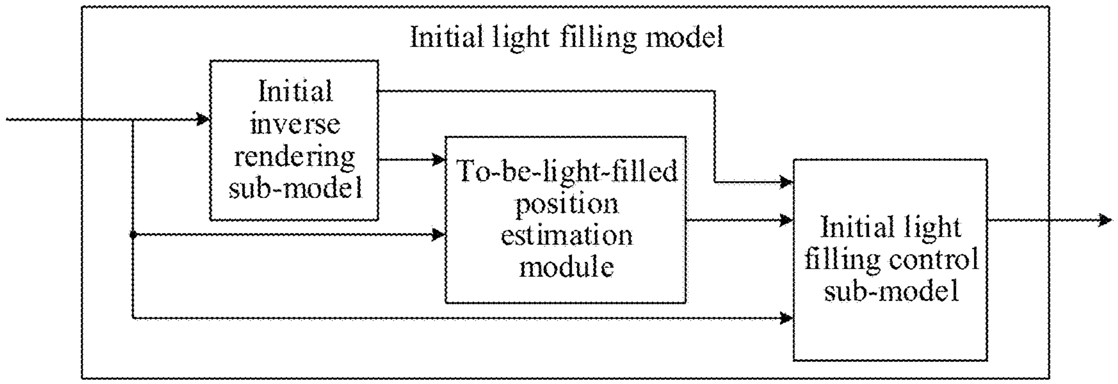
FIG. 2 is a schematic structural diagram of an initial light filling model according to an embodiment of this application.

FIG. 2 is a schematic structural diagram of an initial light filling model according to an embodiment of this application. As shown in FIG. 2, the initial light filling model includes an initial inverse rendering sub-model, a to-be-light-filled position estimation module, and an initial light filling control sub-model.

The initial inverse rendering sub-model, the to-be-light-filled position estimation module, and the initial light filling control sub-model are all connected to an input end. The input end is configured to input the to-be-light-filled composite rendered image.

The initial inverse rendering sub-model is further connected to both the to-be-light-filled position estimation module and the initial light filling control sub-model. The initial inverse rendering sub-model is configured to disassemble the to-be-light-filled composite rendered image, and analyze the albedo information, the normal information, and the environment corresponding to the portrait.

The to-be-light-filled position estimation module is further connected to a target light filling control sub-model. The to-be-light-filled position estimation module is configured to estimate a pose of the portrait, determine a Euler angle (yaw, roll, pitch) corresponding to the portrait, then determine a to-be-light-filled position with reference to a position of a light source in the environment and the pose of the portrait, and fill the environment with light.

The initial light filling control sub-model is configured to connect to an output end. The initial light filling control sub-model is configured to fill the portrait with light with reference to the light-filled environment, to intend to obtain an image that is the same as the light-filled composite rendered image.

According to the method for training a light filling model provided in this embodiment of this application, in the training process, a new method of constructing data is used for constructing a more realistic training image to train the initial light filling model, thereby improving a processing effect of the obtained target light filling model.

Figure 3:
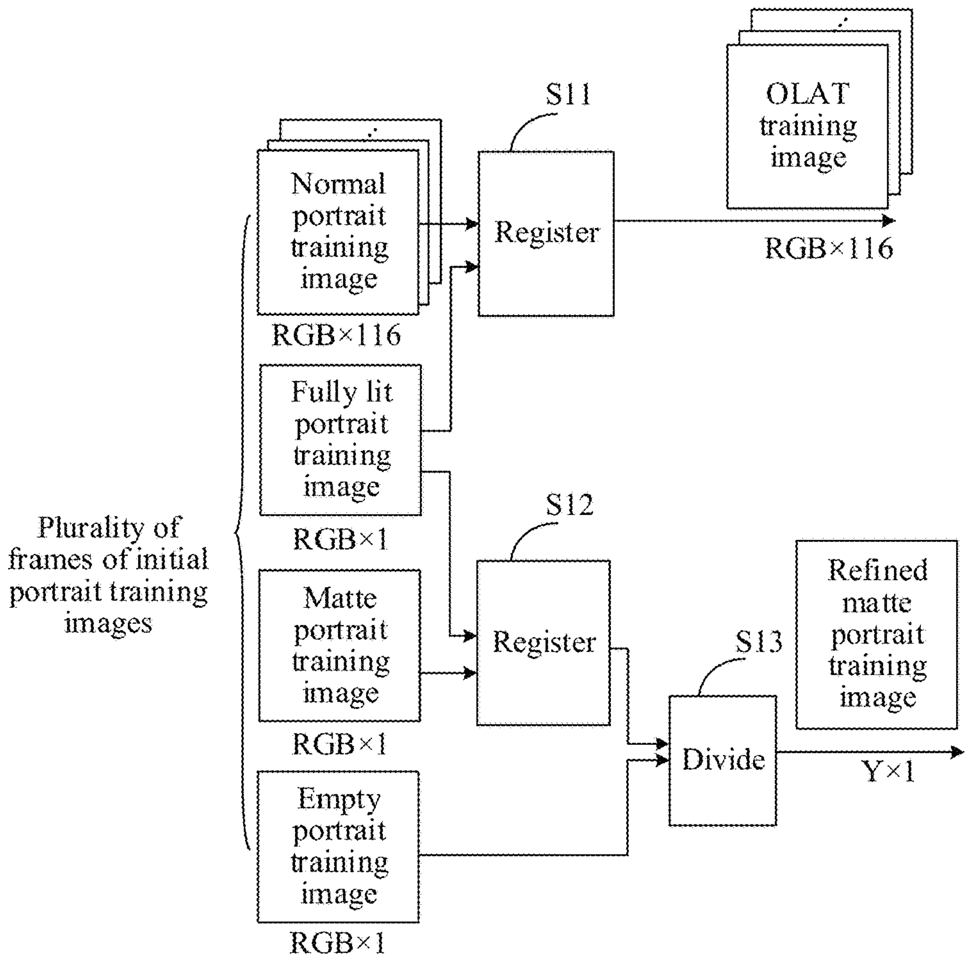
FIG. 3 is a schematic flowchart of an obtaining stage and a first processing stage according to an embodiment of this application.

FIG. 3 shows a schematic flowchart of a first processing stage. The first processing stage is used for constructing training data for a second processing stage and a third processing stage. As shown in FIG. 3, the first processing stage includes the following S11 to S13.

S11: Register, based on a fully lit portrait training image, a plurality of frames of normal portrait training images to obtain a plurality of frames of registered normal portrait training images.

Each frame of registered normal portrait training image may be referred to as an OLAT training image.

S12: Register, based on the fully lit portrait training image, a matte portrait training image to obtain a registered matte portrait training image.

S13: Divide the registered matte portrait training image by an empty portrait training image to obtain a refined matte (matte) portrait training image.

It should be understood that dividing the registered matte portrait training image by the empty portrait training image means dividing pixel values at a same position. A difference between the registered matte portrait training image and the empty portrait training image is only that a portrait exits or not in the image. During division, pixel values of regions having same content in the registered matte portrait training image and the empty portrait training image are the same, and a value obtained through division is 1. Pixel values of regions having different content are different, and a value obtained through division is not 1. Therefore, after the division operation is performed, it is equivalent to sharpening a portrait region and a background region, so that a distinction between the portrait region and the background region is obvious.

It should be understood that the refined matte portrait training image is a Y image or a grayscale image. The refined matte portrait training image is finer than the registered matte portrait training image mask, and can exhibit details such as a hair strand.

In the first processing stage, the matte portrait training image and the empty portrait training image are obtained and divided to obtain the refined matte portrait training image, so that the portrait and a background environment are more finely distinguished and processed subsequently based on the refined matte portrait training image.

Figure 4:
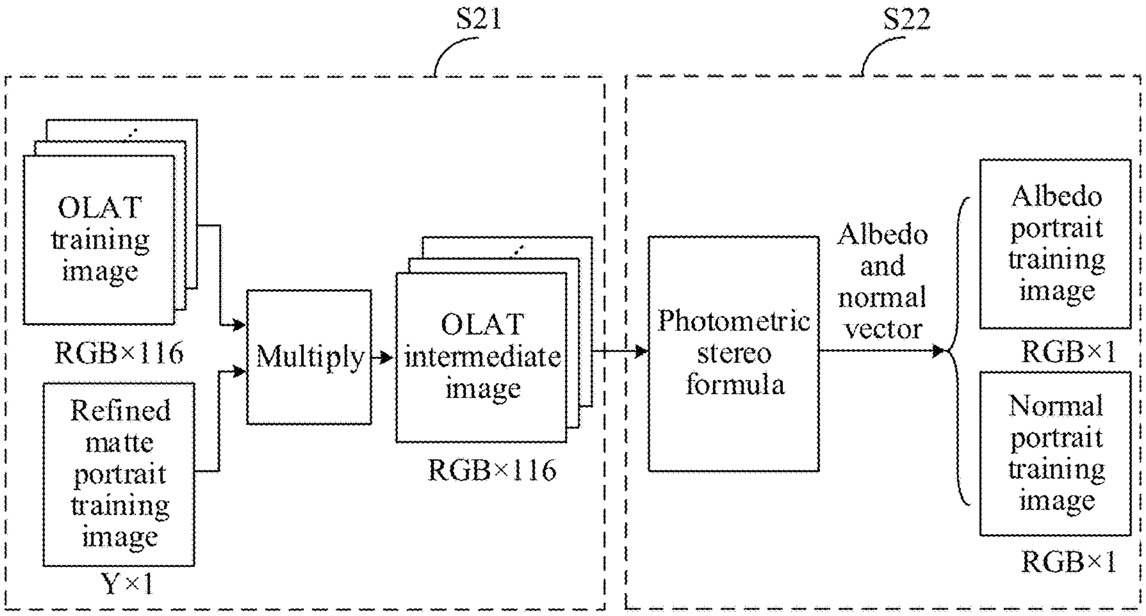
FIG. 4 is a schematic flowchart of a second processing stage according to an embodiment of this application.

FIG. 4 shows a schematic flowchart of a second processing stage. As shown in FIG. 4, the second processing stage is used for construct training data for a model training stage based on the OLAT training image and the refined matte portrait training image obtained in the first processing stage. The second processing stage includes the following S21 and S22.

S21: Multiply the plurality of frames of registered normal portrait training images, or the plurality of frames of OLAT training images by the refined matte portrait training image respectively to obtain a plurality of frames of OLAT intermediate images.

It should be noted that multiplying the plurality of frames of registered normal portrait training images, or the plurality of frames of OLAT training images by the refined matte portrait training image respectively is equivalent to weighting each frame of OLAT training image based on the portrait and the background environment divided in the refined matte portrait training image, thereby enabling the distinction between the portrait and the background environment in the obtained OLAT intermediate image to be more obvious and richer in detail.

S22: Determine, based on at least three frames of OLAT intermediate images among the plurality of frames of OLAT intermediate images, an albedo and a normal vector at a position of each pixel by using a photometric stereo formula, and generate an albedo portrait training image and a normal portrait training image.

It should be understood that the photometric stereo formula is a method of estimating a surface geometric shape by using a plurality of light source directions. According to the method, a normal vector of a surface point of an object and albedos of different surface points of the object may be reconstructed. In this embodiment of this application, through the method, a normal vector of a surface point of the portrait and albedos of different surface points of the portrait may be reconstructed.

The photometric stereo formula is:

$$t=\rho\times(N\times L)\times I$$

In the above formula, t represents a pixel value, ρ represents an albedo of an object surface, N represents a three-dimensional surface normal vector, L represents a three-dimensional unit light source position vector, and I represents light source intensity.

The pixel value t may be directly obtained from the OLAT intermediate image, the unit light source position vector may be calibrated in advance, and the light source intensity may be represented by a constant 1. In this way, when the portrait and the camera do not change, at least three frames of OLAT intermediate images are used to establish at least three photometric stereo formulas to form a system of equations, and the albedo and the normal vector of each surface point of the portrait may be solved.

It should be understood that when the light source illuminates the surface of the object, a shadow may exist, so that a result cannot be solved in a region that cannot be illuminated by the three light sources at the same time. Therefore, in this embodiment of this application, more than three frames of OLAT intermediate images such as 116 frames of OLAT intermediate images are selected for solution, and 116 light-emitting sources separately illuminate the portrait from different directions and imaging is performed, to resolve this problem.

It should be understood that if the albedo and the normal vector are solved by using three frames of OLAT intermediate images, illumination directions of the light sources corresponding to the three frames of OLAT intermediate images are not coplanar.

In the second processing stage, in this application, an albedo and a normal vector at a position of a corresponding pixel are solved according to the plurality of frames of OLAT training images by using the photometric stereo formula, so that the albedo portrait training image representing the portrait albedo information and the normal portrait training image representing the portrait normal information can be constructed, so as to be provided to the model training stage for model training.

Figure 5:
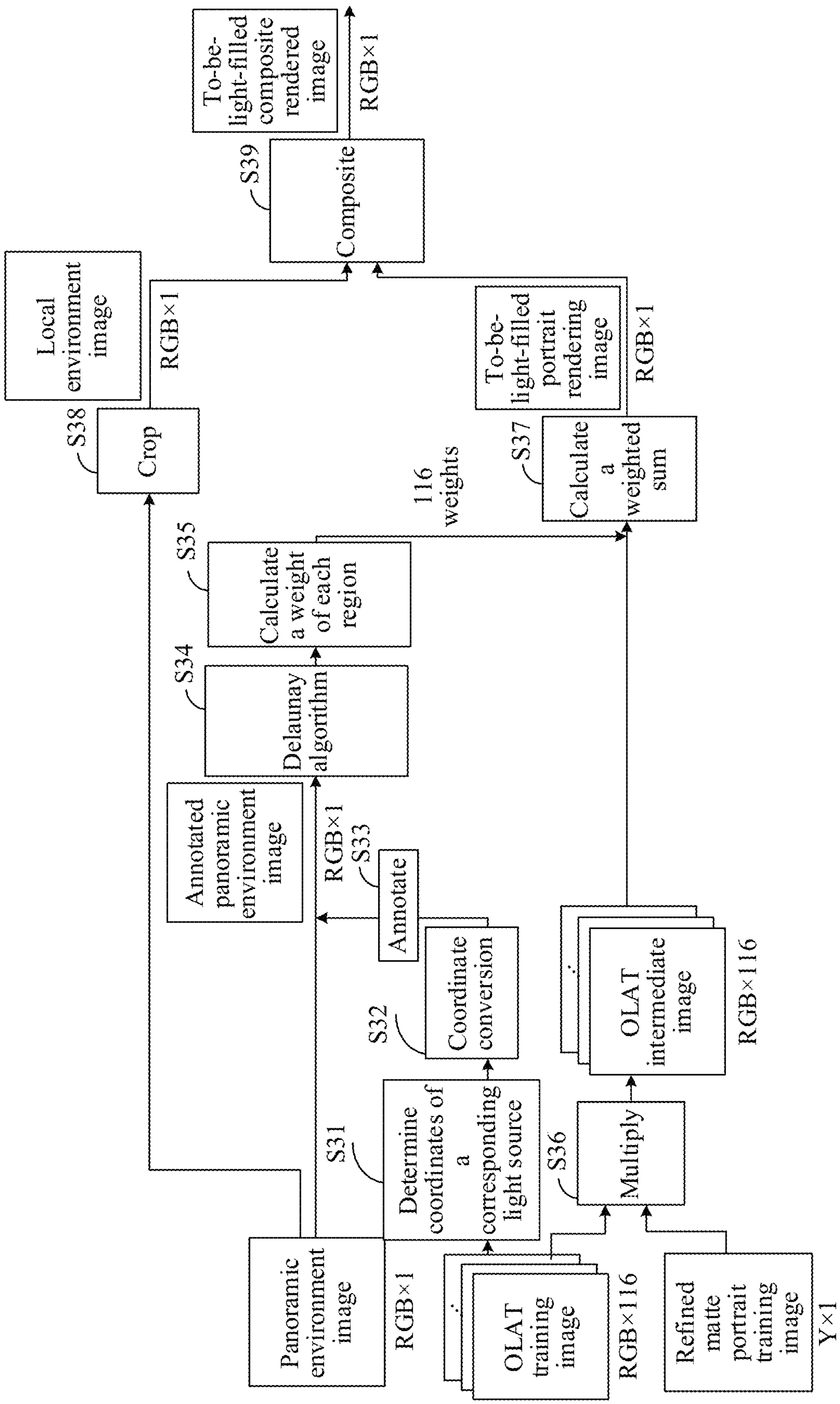
FIG. 5 is a schematic flowchart of a first sub-stage in a third processing stage according to an embodiment of this application.

FIG. 5 shows a schematic flowchart of a first sub-stage in a third processing stage. The third processing stage is used for constructing a training image for a model training stage based on the image obtained in the first processing stage and the panoramic environment image. The third processing stage includes a first sub-stage and a second sub-stage, and the first sub-stage is used for constructing a to-be-light-filled composite rendered image for the model training stage. As shown in FIG. 5, the first sub-stage includes the following S31 to S39.

S31: Determine rectangular coordinates of a light source corresponding to each frame of OLAT training image based on the plurality of frames of OLAT training images.

S32: Convert the rectangular coordinates into polar coordinates.

S33: Annotate, based on the polar coordinates corresponding to the light source, positions of all light sources on the panoramic environment image to obtain an annotated panoramic environment image.

The annotated panoramic environment image is annotated with positions of the light sources corresponding to all the OLAT training images.

In this application, when the plurality of frames of OLAT training images are obtained by using the lighting apparatus, each frame of OLAT training image corresponds to turning on only one LED light source. Therefore, in turn, rectangular coordinates of a corresponding LED light source may be determined by one frame of OLAT training image, and then the rectangular coordinates are converted into polar coordinates under the panorama. Therefore, polar coordinates of 116 LED light sources corresponding to 116 frames of OLAT training images may be determined based on the 116 frames of OLAT training images, and then the 116 polar coordinates are annotated on the panoramic environment image, so that an annotated panoramic environment image annotated with the 116 LED light source positions may be obtained.

The rectangular coordinates of the LED light source are determined by a rectangular coordinate system with the center position of the lighting apparatus as an origin.

In another embodiment, by using a principle of spherical reflection of a metal ball, a metal ball may alternatively be placed at the center position of the lighting apparatus to replace the to-be-photographed portrait. In this way, a panorama including 116 LED light sources may be captured by a camera, and positions of the LED light sources in the panorama may be mapped to the panoramic environment image and annotated to obtain an annotated panoramic environment image.

S34: Divide the annotated panoramic environment image into regions based on the positions of the light sources by using a delaunay (delaunay) algorithm.

The delaunay algorithm refers to a meshed plane control image formed by a series of continuous triangles, which is in a main expansion form of laying out the continuous triangles in triangulation, and expand in all directions to form a mesh at the same time.

In this embodiment of this application, triangle division is performed by using each LED light source position on the annotated panoramic environment image as a center by using the delaunay algorithm, so that the entire annotated panoramic environment image may be divided into a mesh structure formed 116 triangular regions.

In some other embodiments, quadrilateral, pentagonal, or hexagonal division may alternatively be performed by using each LED light source position as a center, so that the entire annotated panoramic environment image may be divided into a mesh structure formed by 116 quadrilateral, pentagonal, or hexagonal regions. A shape of a specific division can be selected and changed as required, which is not limited in this embodiment of this application.

It should be understood that the regions divided in the annotated panoramic environment image are in one-to-one correspondence with the OLAT training images, or are in one-to-one correspondence with the light sources corresponding to the OLAT training images.

S35: Determine a weight corresponding to each region.

A pixel value (RGB) corresponding to each pixel in a triangular region may be converted into a YUV value, where a Y value represents brightness, and an average value of brightness corresponding to all pixels in each triangular region is calculated, that is, an average luminance is used as a weight corresponding to the region. Therefore, in this embodiment of this application, 116 weights corresponding to 116 triangular regions may be obtained.

It should be noted that determining the weight corresponding to each region is equivalent to determining a brightness degree that needs to be configured for the 116 light sources when an illumination condition corresponding to the panoramic environment image is composited by using the 116 light sources in the lighting apparatus.

S36: Multiply the plurality of frames of OLAT training images by the refined matte portrait training image respectively to obtain a plurality of frames of OLAT intermediate images.

In the second processing stage, the plurality of frames of OLAT training images are respectively multiplied by the refined matte portrait training image. In this case, the OLAT intermediate image obtained after multiplication may also be directly obtained from the second processing stage.

S37: Calculate a weighted sum based on the plurality of frames of OLAT intermediate images and the weight corresponding to each region in the annotated panoramic environment image, to obtain a to-be-light-filled portrait rendering image.

It should be understood that in this embodiment of this application, when an OLAT training image corresponding to each frame of OLAT intermediate image is obtained, only one LED light source performs illumination. In this way, each frame of OLAT training image or each frame of OLAT intermediate image may be used as a reference illumination degree of a corresponding LED light source.

The weight corresponding to each triangular region in the annotated panoramic environment image reflects a proportion of the illumination of each LED light source if the 116 LED light sources perform illumination at the same time when the environment is constructed. Therefore, a weight corresponding to the triangular region where the LED light source is located in the annotated panoramic environment image may be used as a weight corresponding to the OLAT intermediate image, and the weight is used for representing a proportion of the OLAT intermediate image in an environment shown in the annotated panoramic environment image.

In this way, after a weighted sum of all the OLAT intermediate images and the corresponding weights is calculated, light and shadow effects corresponding to the portrait in a complex illumination scene formed by all the light sources with different brightness degrees in the environment shown in the annotated panoramic environment image.

Based on the above, optionally, the to-be-light-filled portrait rendering image may be further multiplied again by the refined matte portrait training image to obtain a to-be-light-filled portrait rendering image having richer details.

S38: Crop the panoramic environment image to obtain a local environment image.

A size of the local environment image should be the same as a size of the to-be-light-filled portrait rendering image.

It should be noted that the portrait is usually set at a quarter position in a lateral direction of the panoramic environment image. Therefore, a local region with the same size as the to-be-light-filled portrait rendering image may be cropped at the left quarter position or the right quarter position of the panoramic environment image as the local environment image.

S39: Composite the to-be-light-filled portrait rendering image and the local environment image to obtain a to-be-light-filled composite rendered image.

It should be understood that the local environment image is used to represent an environment image captured by the camera under an environment shown in the panoramic environment image. In other words, a picture captured by the camera is a part of the panoramic environment image.

The to-be-light-filled portrait rendering image and the local environment image are composited, that is, the to-be-light-filled portrait rendering image is attached to the local environment image, so that an illumination condition of the environment and light and shadow effects of a person in the environment can be represented.

In the first sub-stage of the third processing stage, in this application, after rectangular coordinates of light sources corresponding to OLAT training images are converted, positions of polar coordinates of all the light sources may be annotated in a panoramic environment image to obtain an annotated panoramic environment image; then a weight corresponding to a region where each light source is located is determined from the annotated panoramic environment image, and the weight is used as the weight of each light source to composite the illumination condition of the environment, so that a weighted sum of the OLAT intermediate images may be calculated based on the weight to obtain light and shadow effects achieved by a person under the illumination condition of the environment, that is, a to-be-light-filled portrait rendering image is obtained; and then after the panoramic environment image is cropped and composited with the to-be-light-filled composite rendered image, a to-be-light-filled portrait rendering image that represents the illumination condition of the environment and the light and shadow effects of the person in the environment may be obtained.

Figure 6:
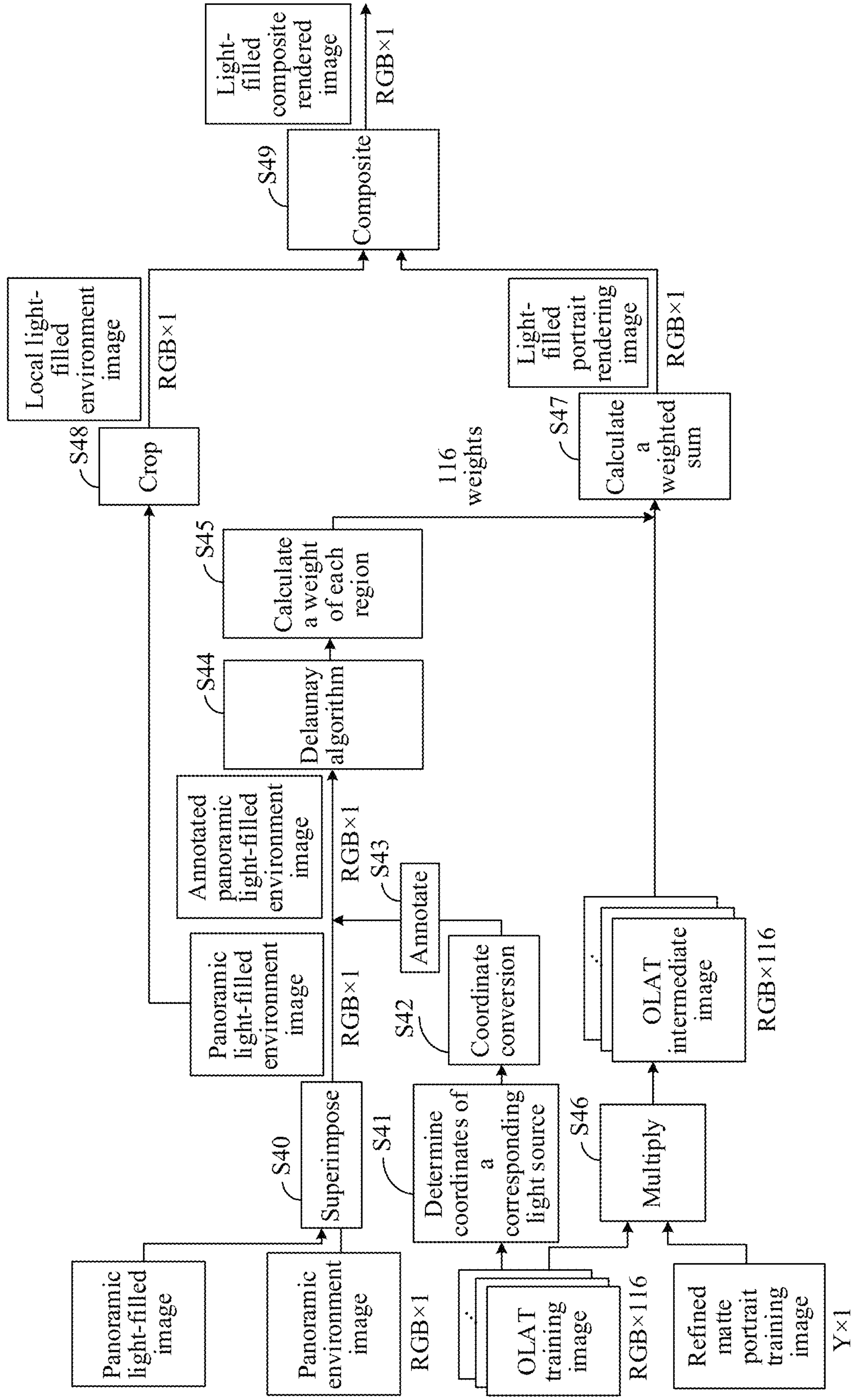
FIG. 6 is a schematic flowchart of a second sub-stage in a third processing stage according to an embodiment of this application.

FIG. 6 shows a schematic flowchart of a second sub-stage in a third processing stage. As shown in FIG. 6, in the third processing stage, the second sub-stage of the third processing stage is used for constructing a light-filled composite rendered image for the model training stage. S41 to S49 of the second sub-stage are substantially the same as S31 to S39 of the first sub-stage, and only S40 is added.

A process of the second sub-stage is described in detail below with reference to S40 and S41 to S49.

S40: Obtain a panoramic light-filled image, and superimpose the panoramic light-filled image and the panoramic environment image to obtain a panoramic light-filled environment image.

The panoramic light-filled image is used to represent a light filling condition of a light source, that is, the image reflects the radiation from the light source position, and increases a degree of light in the radiated region.

In the embodiments of this application, the principle of metal spherical reflection can be used for placing the metal ball at the center position of a light-emitting apparatus instead of the to-be-photographed portrait. Then, a controller is configured to randomly control a light source to illuminate the metal ball to represent the light filling illumination, so that a panoramic light-filled image can be obtained by photographing the metal ball by using the camera. When different light sources are turned on to illuminate the metal ball, a plurality of frames of different panoramic light-filled images can be obtained by photographing the metal ball by using the camera.

The panoramic light-filled image is superimposed with the panoramic environment image, that is, the light filling condition of the light source represented by the panoramic light-filled image is superimposed with the lighting condition represented by the existing panoramic environment image, so that the lighting condition in the environment after the light filling can be simulated, and the panoramic light-filled environment image can be obtained.

Certainly, the position of the light filling source may not be the position of the 116 LED light sources in the lighting apparatus, and may be set as required, which is not limited by the embodiment of this application.

S41: Determine rectangular coordinates of a light source corresponding to each frame of OLAT training image based on the plurality of frames of OLAT training images.

S42: Convert the rectangular coordinates into polar coordinates.

S43: Annotate the position of the light source on the panoramic light-filled environment image based on the polar coordinates corresponding to the light source, to obtain the annotated panoramic light-filled environment image.

It should be understood that the processes of S41 and S43 are the same as those of S31 and S33, respectively. For details, reference may be made to the above description. Details are not described herein again.

S44: Divide the annotated panoramic light-filled environment image into regions based on a delaunay (delaunay) algorithm.

It should be understood that the region divided in the annotated panoramic light-filled environment image correspond one-to-one with the OLAT training image, or one-to-one with the light source corresponding to the OLAT training image.

S45: Determine a weight corresponding to each region.

It should be understood that S44 and S45 operate the same as S34 and S35. However, since S44 is a triangular region formed by dividing the region of the panoramic environment after the light filling, the weight of each region determined by S45 is the weight after the light filling, which is different from the weight determined by S35.

S46: Multiply the plurality of frames of OLAT training images by the refined matte portrait training image to obtain a plurality of frames of OLAT intermediate images.

S47: Calculate a weighted sum based on the weight corresponding to each region in the plurality of frames of OLAT intermediate images and the annotated panoramic light-filled environment image, to obtain the light-filled portrait rendering image.

It should be understood that in the embodiment of this application, when obtaining the OLAT training image corresponding to the OLAT intermediate image of each frame, only one LED light source is irradiated. In this way, each frame of the OLAT training image or each frame of the OLAT intermediate image can be used as a reference illumination level of the corresponding LED light source.

The weight corresponding to each triangular region in the annotated panoramic light-filled environment image reflects a proportion of the illumination of each LED light source if the 116 LED light sources are lit at the same time when the light filling environment is constructed. As a result, the weight corresponding to the triangle region where the LED light source is located in the annotated panoramic light-filled environment image can be used as the weight corresponding to the OLAT intermediate image, and the weight can be used for representing the proportion of the OLAT intermediate image in the light filling environment shown in the annotated panoramic light-filled environment image.

In this way, after a weighted sum of all the OLAT intermediate images and the corresponding weights are calculated, the light and shadow effect corresponding to the portrait can be obtained in a complex lighting scene formed by all light sources presenting different levels of brightness and light filling sources in the light filling environment shown in the annotated panoramic light-filled environment image.

Based on the above, optionally, the light-filled portrait rendering image may also be multiplied again by the refined matte portrait training image to obtain a light-filled portrait rendering image having rich details.

S48: Crop the panoramic light-filled environment image to obtain a local light-filled environment image.

In this case, a size of the local light-filled environment image should be the same as a size of the light-filled portrait rendering image.

It should be noted that the portrait is usually set at a quarter position in a lateral direction of the panoramic light-filled environment image. Therefore, a local region with the same size as the light-filled portrait rendering image can be cropped at the left quarter position or the right quarter position of the panoramic light-filled environment image as the local light-filled environment image.

S49: Composite the light-filled portrait rendering image and the local light-filled environment image to obtain the light-filled composite rendered image.

It should be understood that the local light-filled environment image is used to represent the light-filled environment image captured by the camera under the environment shown in the panoramic light-filled environment image. In other words, the picture captured by the camera is a part of the panoramic light-filled environment image.

The light-filled portrait rendering image and the local light-filled environment image are composited, that is, the local light-filled environment image is attached to the local light filling environment, so that a lighting condition of the environment after the environment is filled with light and a light and shadow effect of a person in the light filling environment can be represented.

In the second sub-stage of the third processing stage, by superimposing the panoramic light-filled image and the panoramic environment image, this application can simulate the effect of the light filling on the environment, thereby obtaining the panoramic light-filled environment image. By converting the rectangular coordinates of the light source corresponding to the OLAT training image, the polar coordinate positions of all light sources can be annotated in the panoramic light-filled environment image to obtain the annotated panoramic light-filled environment image. Then, a weight corresponding to the region of each light source is determined from the annotated panoramic environment image, and the weight is used as the weight of each light source to composite the lighting condition of the light filling environment, so that a weighted sum of the OLAT intermediate image can be calculated based on the weight to obtain the light and shadow effect achieved by the person under the lighting condition of the light filling environment, that is, the light-filled portrait rendering image is obtained. Subsequently, after the panoramic light-filled environment image is cropped and composited with the to-be-light-filled portrait rendering image, a light-filled composite rendered image with light representing the lighting condition of the environment after the light filling and the light and shadow effect of the person in the environment after the light filling can be obtained.

It should be understood that when the second sub-stage and the first sub-stage process the same frame of panoramic environment image and the same set of OLAT training images, the light-filled composite rendered image obtained in the second sub-stage and the to-be-light-filled composite rendered image obtained in the first sub-stage are a set of image pairs, the environment and the content of the person are the same, the difference is only whether the portrait and the environment are filled with light.

In this case, different panoramic environment images can be combined, and based on the steps of the third processing stage described above, a plurality of to-be-light-filled composite rendered imaged and light-filled composite rendered images are constructed to be provided to the model training stage for training.

Figure 7:
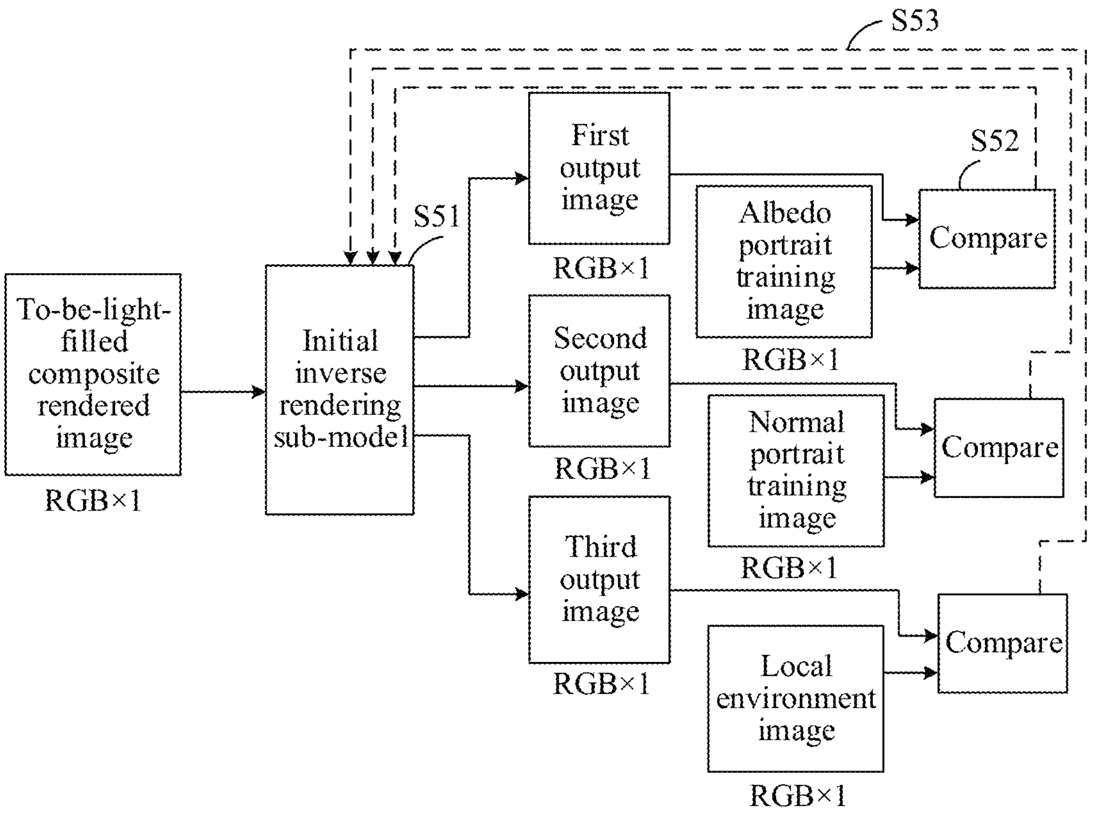
FIG. 7 is a schematic diagram of a training flow of an initial inverse rendering sub-model according to an embodiment of this application.

FIG. 7 shows a schematic diagram of a training flow of an initial inverse rendering sub-model in a model training phase. As shown in FIG. 7, the training flow includes the following S51 to S53.

S51: Input the to-be-light-filled composite rendered image obtained in S39 into the initial inverse rendering sub-model to obtain a first output image, a second output image, and a third output image.

The initial inverse rendering sub-model is a model of a codec structure, for example, the sub-model may be a U-net model. Certainly, the sub-model may be another network model, which is not limited in this embodiment of this application.

It should be understood that the initial inverse rendering sub-model is configured to disassemble the person and the environment of the to-be-light-filled composite rendered image to obtain a separate environment image and an image that can represent an albedo characteristic of the person and a normal characteristic.

S52: Compare the first output image with the albedo portrait training image obtained in S23, compare the second output image with the normal portrait training image obtained in S23, and compare the third output image with the local environment image obtained in S38.

S53: Adjust the parameters in the initial inverse rendering sub-model if the first output image is not similar to the albedo portrait training image, the second output image is not similar to the normal portrait training image, and the third output image is not similar to the local environment image; and use the trained initial inverse rendering sub-model as the target inverse rendering sub-model if the first output image is similar to the albedo portrait training image, the second output image is similar to the normal portrait training image, and the third output image is similar to the local environment image.

For example, a first similarity threshold, a second similarity threshold, and a third similarity threshold can be set in advance. The first output image is compared with the albedo portrait training image to determine whether the similarity is greater than the first similarity threshold; the second output image is compared with the normal portrait training image to determine whether the similarity is greater than the second similarity threshold; and the third output image is compared with the local environment image to determine whether the similarity is greater than the third similarity threshold. If all the three are greater than their corresponding similarity thresholds, the similarity is determined, and the trained initial inverse rendering sub-model can be used as the target inverse rendering sub-model. Otherwise, the parameters in the initial inverse rendering sub-model are adjusted and training continues until similar conditions are reached.

It should be understood that the initial inverse rendering sub-model is trained by using compositing the to-be-light-filled composite rendered image, the albedo portrait training image, the normal portrait training image, and the local environment image, so that the target inverse rendering sub-model that can disassemble portrait albedo information, portrait normal direction information, and environmental information from complex images can be obtained.

Figure 8:
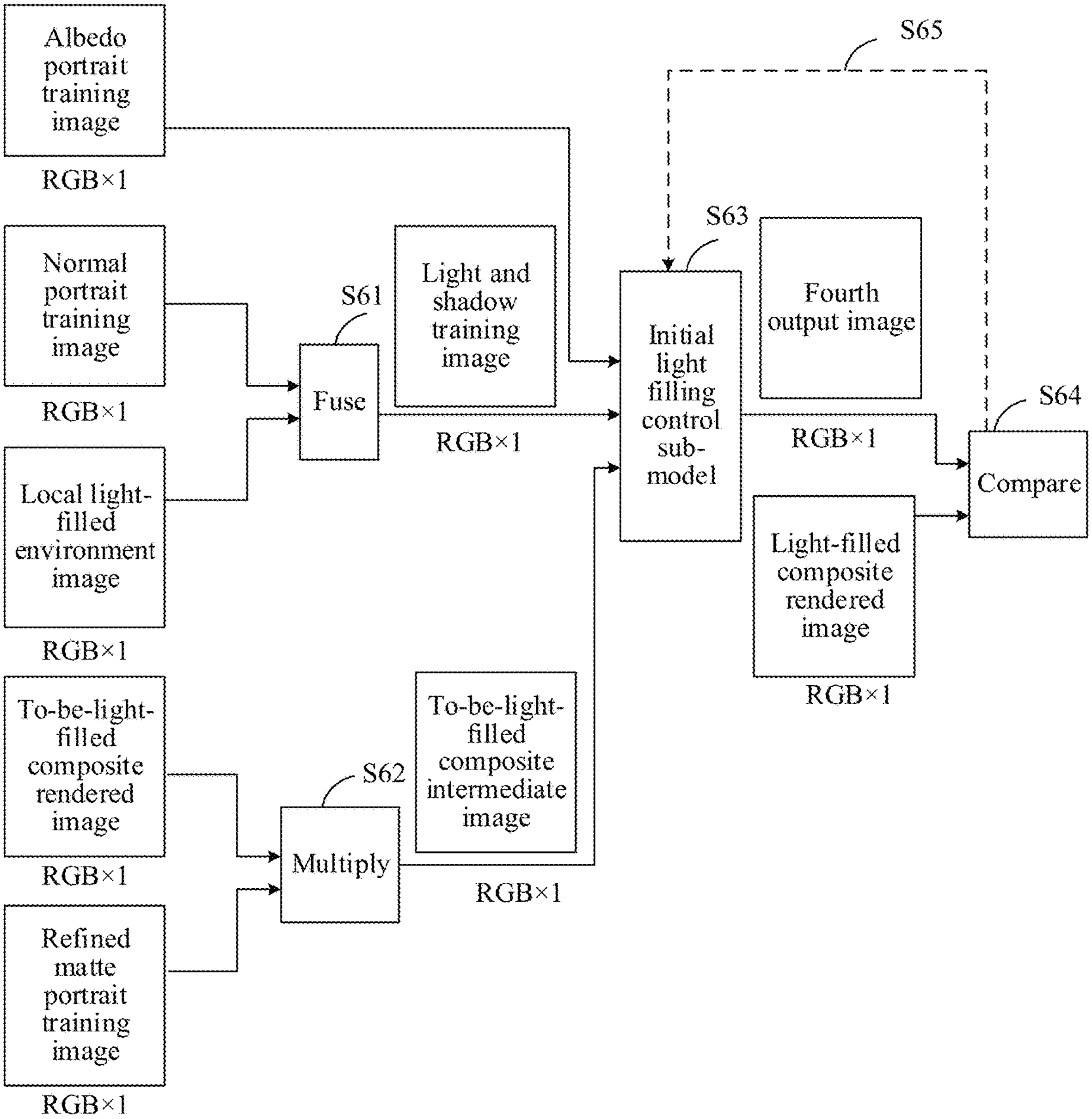
FIG. 8 is a schematic diagram of a training flow of an initial light filling control sub-model according to an embodiment of this application.

FIG. 8 shows a schematic diagram of a training flow of an initial light filling control sub-model. As shown in FIG. 8, the training flow includes the following S61 to S65.

S61: Fuse the normal portrait training image obtained in S23 and the local light-filled environment image obtained in S48 to obtain a light and shadow training image.

S62: Multiply the to-be-light-filled composite rendered image obtained in S39 by the refined matte portrait training image obtained in S13 to obtain a to-be-light-filled composite intermediate image.

S63: Input the albedo portrait training image, the normal portrait training image, the light and shadow training image, and the to-be-light-filled composite intermediate image obtained in S23 into the initial light filling control sub-model to obtain the fourth output image.

For example, the initial light filling control sub-model may be a U-net model. Certainly, the sub-model may be another network model, which is not limited in this embodiment of this application.

S64: Compare the fourth output image with the light-filled composite rendered image obtained in S49.

S65: Adjust the parameters in the initial light filling control sub-model if the fourth output image is not similar to the light-filled composite rendered image; and use the trained initial light filling control sub-model as the target light filling control sub-model if the fourth output image is similar to the light-filled composite rendered image.

For example, a fourth similarity threshold can be preset. The fourth output image is compared with the light-filled composite rendered image to determine whether the similarity is greater than the fourth similarity threshold. If the similarity is greater than the fourth similarity threshold, it is determined that the images are similar, and the trained initial light filling control sub-model can be used as the target light filling control sub-model. Otherwise, the parameters in the initial light filling control sub-model are adjusted and training continues until a similar condition is reached.

It should be understood that the initial light filling control sub-model is trained by using the to-be-light-filled composite rendered image, the refined matte portrait training image, the albedo portrait training image, the normal portrait training image, the local light-filled environment image, and the light-filled composite rendered image. In this way, the target light filling control sub-model that may fill the portrait with light can be obtained based on the light filling information in the light filling environment and using the portrait albedo information and the portrait normal direction information.

It should be understood that the following example is merely intended to help a person skilled in the art to understand the embodiments of this application, and is not intended to limit the embodiments of this application to specific values or specific scenes in the example. Obviously, a person skilled in the art may make various equivalent modifications or variations according to the given example. The modifications or variations also fall with the scope of the embodiments of this application.

The following describes the image processing method according to the embodiments of this application in detail with reference to the trained target inverse rendering sub-model, the target light filling control sub-model, and the to-be-light-filled position estimation module.

Figure 9:
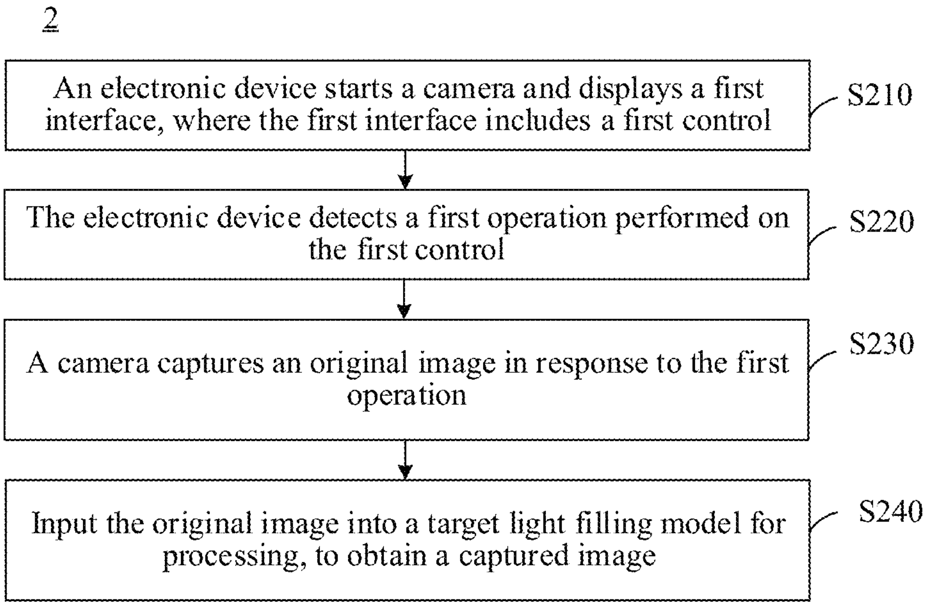
FIG. 9 is a schematic flowchart of an image processing method according to an embodiment of this application.

FIG. 9 is a schematic flowchart of an image processing method 2 according to an embodiment of this application. The image processing method 2 is applicable to an electronic device including a camera. As shown in FIG. 9, the image processing method 2 includes S210 to S240.

S210: The electronic device starts the camera and displays a first interface, where the first interface includes a first control.

The first interface may be a preview interface, and the first control may be a photographing button on the preview interface.

S220: The electronic device detects a first operation of the first control performed on the first interface by a user.

The first operation may be a click operation of the photographing button on the preview interface of the user, and certainly the operation may also be another operation, which is not limited in the embodiment of this application.

S230: The camera captures an original image in response to the first operation.

The original image is an image in an RGB domain, or may be an image in a RAW domain, which is not limited in the embodiment of this application.

It should be understood that the camera may be a main camera, a telephoto camera, an ultra-telephoto camera, a wide-angle camera, an ultra-wide-angle camera, and the like. Types and quantities of cameras are not limited in embodiments of this application.

S240: Input the original image into the target light filling model for processing, to obtain the captured image.

The captured image is an image in the RGB domain.

Figure 10:
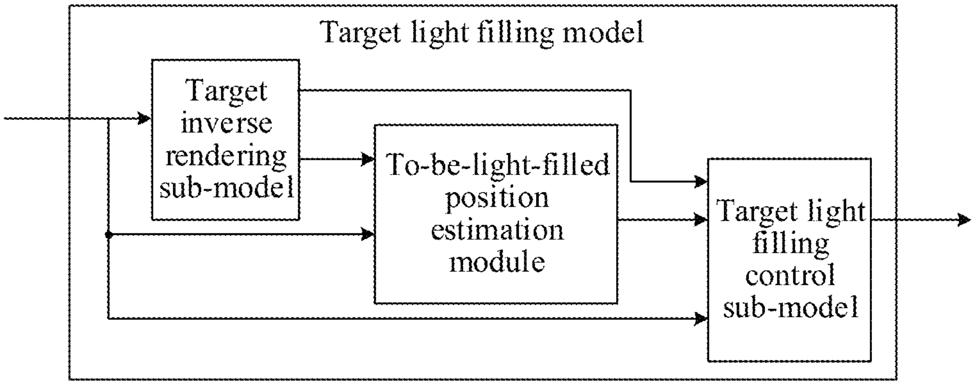
FIG. 10 is a schematic structural diagram of a target light filling model according to an embodiment of this application.
Figure 11:
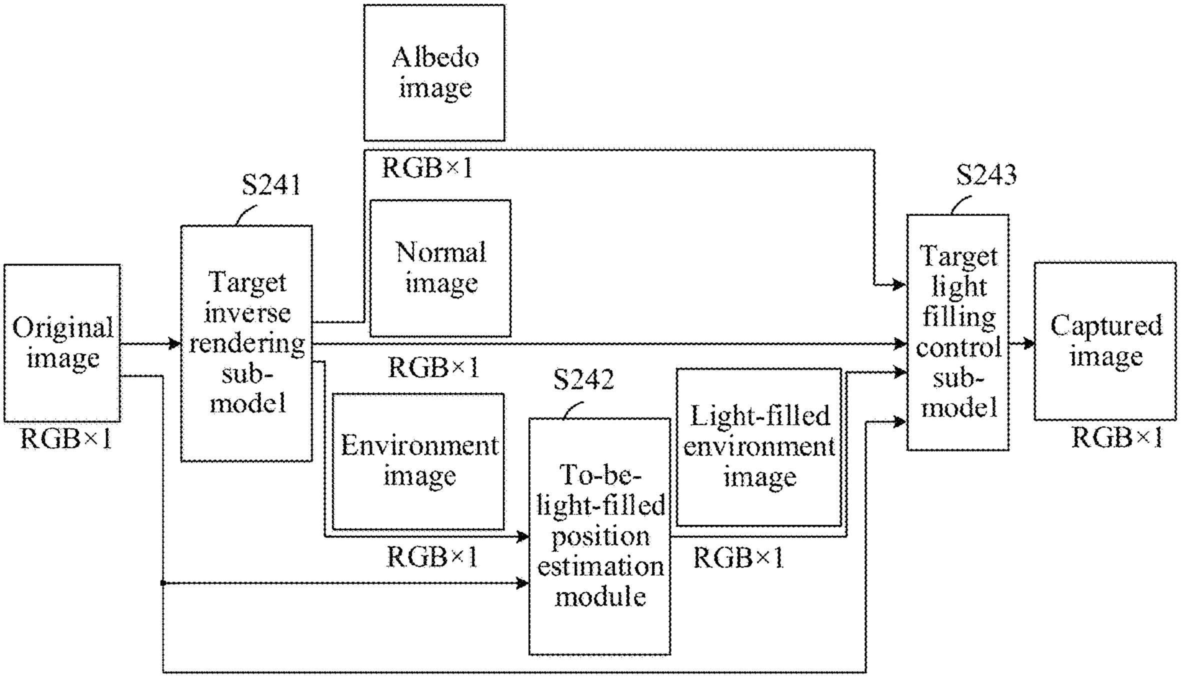
FIG. 11 is a schematic diagram of a processing flow of a target light filling model according to an embodiment of this application.

FIG. 10 is a schematic structural diagram of a target light filling model according to an embodiment of this application, and FIG. 11 is a schematic diagram of a processing flow of a target light filling model according to an embodiment of this application.

As shown in FIG. 10, the target light filling model provided in the embodiment of this application includes: a target inverse rendering sub-model, a to-be-light-filled position estimation module, and a target light filling control sub-model.

With reference to FIG. 10 and FIG. 11, S240 may include the following S241 to S243.

S241: Input the original image into the target inverse rendering sub-model in the target light filling model, to obtain an albedo image, a normal image and, an environment image corresponding to the original image.

The target inverse rendering sub-model is configured to disassemble the person and the environment in the original image. The albedo image is used to represent the albedo characteristic corresponding to the person in the original image. The normal image is used to express the normal characteristic corresponding to the person in the original image. The environment image is used to represent an environment content other than the person in the original image.

S242: Input the original image and the environment image into the to-be-light-filled position estimation module to determine the light filling position, and fill the environment with light image at the light filling position to obtain the light-filled environment image.

It should be understood that the to-be-light-filled position estimation module can determine the light filling position in the environment image based on the posture of the person in the original image and the existing light source, so that the light filling position can be determined in the environment image.

S243: Input the albedo image, the normal image, and the light-filled environment image into the target light filling control sub-model to obtain the captured image.

In addition, to improve the light filling effect of the captured image, the original image may further be inputted into the target light filling control sub-model together with the albedo image, the normal image, and the light-filled environment image for processing.

An embodiment of this application provides an image processing method. The target light filling model is configured to disassemble the portrait and environment information of the original image, then fill the environment with light, and then fill the portrait with light based on the light filling environment, so that both the person and the environment can be filled with light, and the captured image having a high definition and a strong contrast can be obtained.

Figure 12:
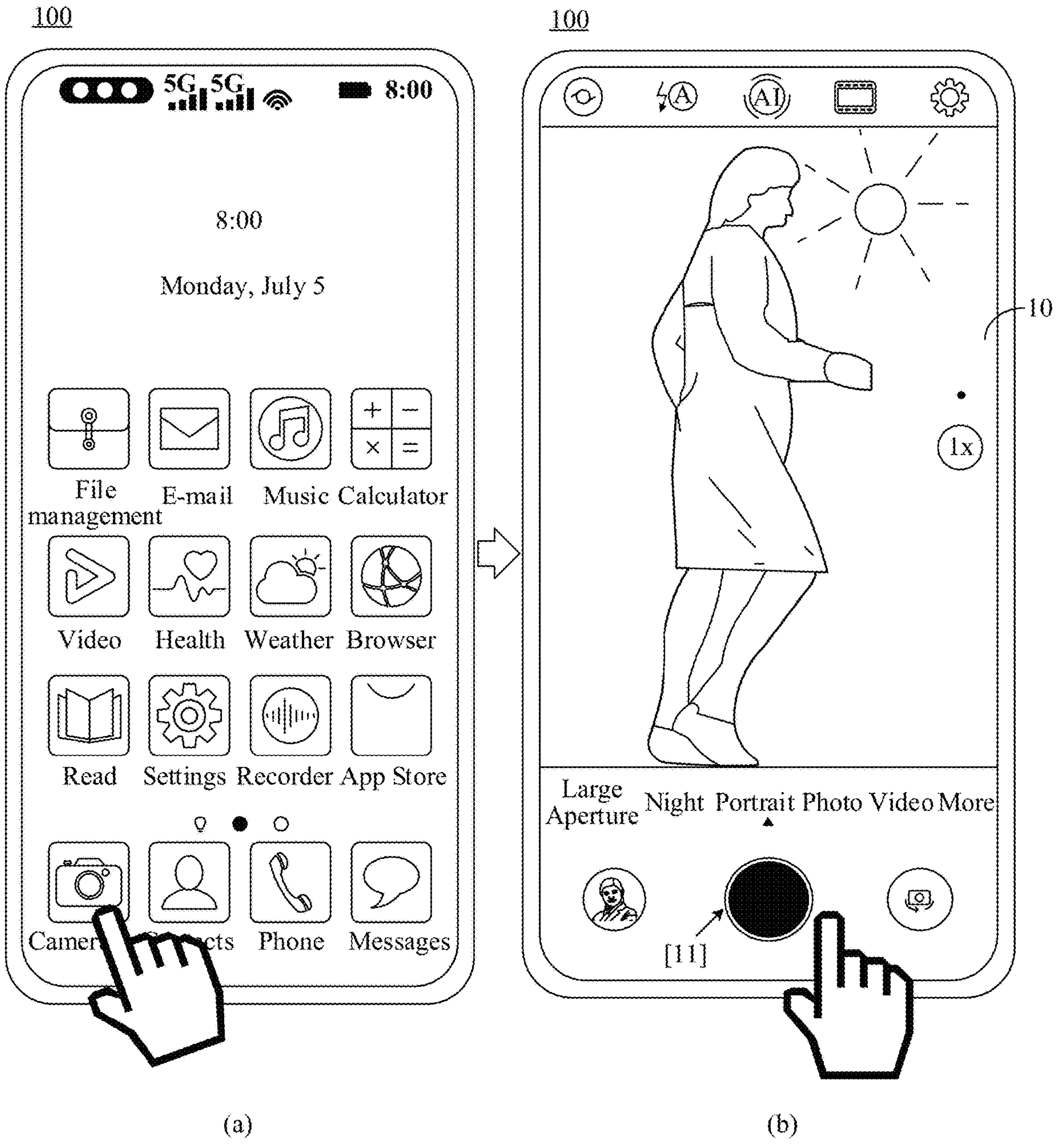
FIG. 12 is a schematic diagram of an interface of an electronic device according to an embodiment of this application.

In an example, FIG. 12 is a schematic diagram of a display interface of an electronic device.

As shown in (a) in FIG. 12, a graphical user interface (graphical user interface, GUI) of the electronic device is shown. After detecting an operation that a user taps an icon of a camera application in the interface, the electronic device may enable the camera application, and displays another GUI shown in (b) in FIG. 12, where the GUI may be referred to as a preview interface.

The preview interface may include a viewfinder window 10. In a preview state, a preview image may be displayed in the viewfinder window 10 in real time. The preview interface may further include a plurality of photographing mode options and a first control, namely, a photographing button 11. For example, the plurality of image capture modes include a photo mode and a video mode. The photographing button 11 is used to indicate that a current photographing mode is the photo mode, the video mode, or another mode. The camera application is usually in the photo mode by default when being enabled.

For example, as shown in (b) in FIG. 12, when the electronic device starts the camera application, in response to a sliding operation of the user, the photographing mode is switched to the portrait mode, and the electronic device runs the program corresponding to the image processing method provided by embodiments of this application. Then, in response to the click operation performed on the photographing button 11 by the user, the electronic device can call the target light filling model to perform light filling processing, and obtain and store the captured image after the light filling.

For example, a woman is exposed to an environment illuminated by strong light in a to-be-photographed scene. When a picture is captured with backlight, the captured image obtained by using related technologies usually have problems such as an unclear image and shadow in some regions due to lack of light. However, these problems can be effectively solved by the image processing method of this application, and the person can be filled with light through the target light filling model, so that the high-resolution and high-definition captured image can be obtained.

Figure 13:
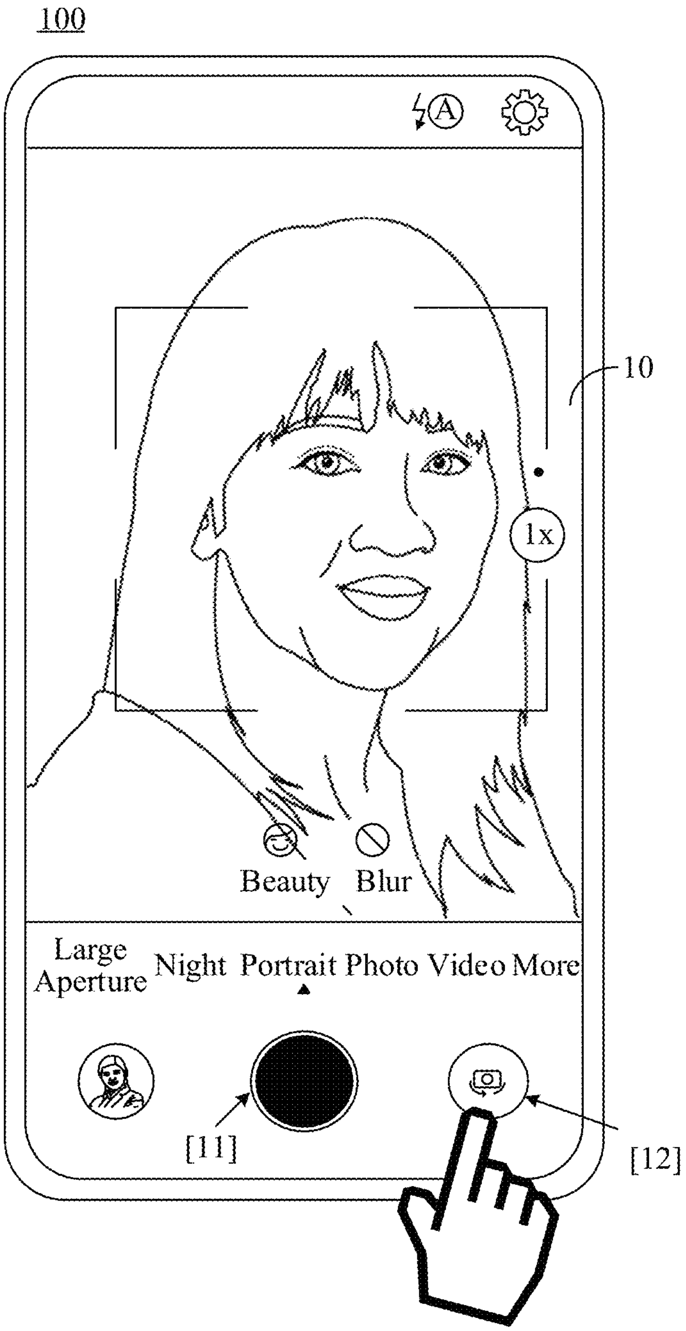
FIG. 13 is a schematic diagram of an interface of an electronic device according to an embodiment of this application.

In an example, FIG. 13 is a schematic diagram of another display interface of an electronic device.

As shown in FIG. 13, the preview interface further includes a lens switching button 12. In response to the user clicking on the lens switching button 12, in a preview state, the viewfinder window 10 can display a preview image captured by a front camera of the electronic device in real time.

For example, as shown in FIG. 13, when the electronic device starts the camera application, in response to the click operation of the user, the electronic device runs the front camera and the program corresponding to the image processing method. Then, in response to the click operation performed on the photographing button 11 by the user, the electronic device can call the target light filling model to perform light filling processing, and obtain and store the captured image after the light filling.

In an example, a local device may obtain relevant parameters of the target light filling model from an execution device, deploy the target light filling model on the local device, and perform image processing using the target light filling model.

In another example, the target light filling model can be directly deployed on the execution device, and the execution device obtains the original image from the local device, and performs image processing on the execution device image based on the target light filling model.

The execution device can be used in conjunction with another computing device, such as a data storage device, a router, and a load balancer. The execution device can be arranged on one physical site, or distributed across a plurality of physical sites. The execution device may use the data in a data storage system, or call program code in the data storage system to implement the image processing method of embodiments of this application.

It should be noted that the execution device may also be referred to as a cloud device, and the execution device may be deployed in the cloud at this time.

The user can operate the respective local device to interact with the execution device. Each local device may represent any computing device, such as a personal computer, a computer workstation, a smartphone, a tablet, a smart camera, a smart vehicle or another type of cellular phone, a media consumer device, a wearable device, a set-top box, and a game console. The local device of each user can interact with the execution device through a communication network of any communication mechanism/communication standard. The communication network may be a wide area network, a local area network, a point-to-point connection, or any combination thereof.

In the image processing method provided in this embodiment of this application, by using the target light filling model to fill the original image with light, a captured image with high definition and strong contrast can be obtained.

The foregoing describes in detail the method for training a light filling model and the image processing method in embodiments of this application with reference to FIG. 1 to FIG. 13. The following describes, with reference to FIG. 14 to FIG. 17, in detail a software system and a hardware system of an electronic device, an apparatus, and a chip that are applicable to this application. It should be understood that the software system, the hardware system, the apparatus, and the chip in embodiments of this application may perform various methods for training a light filling model and the image processing methods in the foregoing embodiments of this application. In other words, for specific operating processes of the following products, refer to corresponding processes in the foregoing method embodiments.

Figure 14:
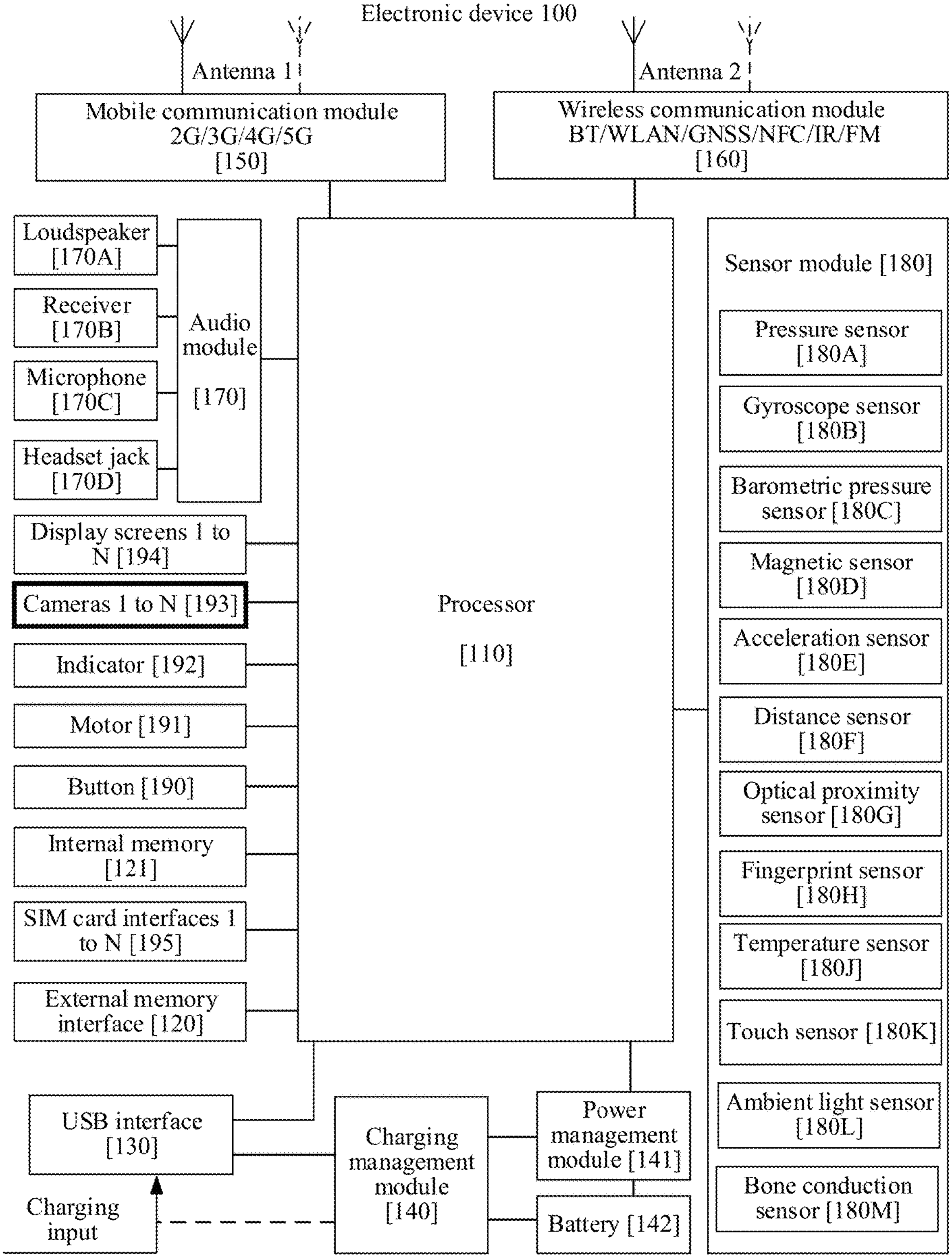
FIG. 14 is a schematic diagram of a hardware structure of an electronic device according to an embodiment of this application.

FIG. 14 is a schematic structural diagram of an electronic device according to this application. The electronic device 100 may be configured to implement the image processing method described in the foregoing method embodiments.

The electronic device 100 may include a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, and an audio module 170, a loudspeaker 170A, a receiver 170B, a microphone 170C, a headset jack 170D, a sensor module 180, a button 190, a motor 191, an indicator 192, a camera 193, a display screen 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, a proximity light sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be separate devices, or may be integrated into one or more processors.

The controller may be a nerve center and a command center of the electronic device 100. The controller may generate an operation control signal according to instruction operation code and a time-sequence signal, and control obtaining and executing of instructions.

A memory may also be disposed in the processor 110, configured to store instructions and data. In some embodiments, the memory in processor 110 is a cache memory. The memory may store instructions or data recently used or cyclically used by the processor 110. If the processor 110 needs to use the instructions or the data again, the processor may directly call the instructions or the data from the memory. Repeated access is avoided, and waiting time of the processor 110 is reduced, thereby improving system efficiency.

The processor 110 may run software code of the image processing method provided in the embodiments of this application to obtain an image with higher definition. The charging management module 140 is configured to receive charging input from the charger. The power management module 141 is configured to be connected to the battery 142, the charging management module 140, and the processor 110. A wireless communication function of the electronic device 100 may be implemented through the antenna 1, the antenna 2, the mobile communication module 150, the wireless communication module 160, the modem processor, the baseband processor, and the like.

The mobile communication module 150 may provide a wireless communication solution including 2G/3G/4G/5G and the like applicable to the electronic device 100. The electronic device 100 implements a display function by using the GPU, the display screen 194, the application processor, and the like. The GPU is a microprocessor for image processing and connects the display 194 and the application processor. The GPU is configured to perform mathematical and geometric calculations, and is configured to render graphics. The processor 110 may include one or more GPUs that execute a program instruction to generate or change display information. The display 194 is configured to display an image, a video, and the like. The display 194 includes a display panel.

The camera 193 is configured to capture still images or videos. may be started through triggering by using an application instruction, to implement a photographing function, for example, obtaining an image of any scene through photographing. The camera may include components such as an imaging lens, a filter, and an image sensor. Light emitted or reflected by an object enters the imaging lens, passes through the filter, and finally converges on the image sensor. The image sensor is mainly configured to converge and image light emitted or reflected by all objects (which may be referred to as a to-be-photographed scene or a target scene or may be understood as a scene image that a user expects to perform photographing) in an angle of view for photographing. The filter is mainly configured to filter out a redundant light wave (for example, a light wave other than visible light, for example, infrared) in the light. The image sensor is mainly configured to perform photovoltaic conversion on a received optical signal, to convert the optical signal into an electrical signal, and input the electrical signal into the processor 130 for subsequent processing. The camera 193 may be located at the front of the electronic device 100 or at the back of the electronic device 100, and a specific quantity and an arrangement manner of the camera may be set as required, on which no limitation is made in this application.

Optionally, the electronic device 100 includes a front camera and a rear camera. For example, the front camera or the rear camera may include 1 or more cameras. For example, the electronic device 100 includes 1 rear cameras. In this way, when the electronic device 100 enables the 1 rear cameras for photographing, the image processing method according to embodiments of this application may be used. Alternatively, the camera is disposed on an external accessory of the electronic device 100. The external accessory is rotatably connected to a frame of the mobile phone, and an angle formed between the external accessory and the display screen 194 of the electronic device 100 is any angle between 0 degree to 360 degrees. For example, when the electronic device 100 takes a selfie, the external accessory drives the camera to rotate to a position facing the user. Certainly, when the mobile phone has a plurality of cameras, only some of the cameras may be disposed on the external accessory, and the remaining cameras may be disposed on a body of the electronic device 100, which is not limited in the embodiment of this application.

The internal memory 121 may be configured to store computer-executable program code. The executable program code includes an instruction. The internal memory 121 may include a program storage region and a data storage region. The internal memory 121 may further store software code of the image processing method provided in the embodiments of this application. When the processor 110 runs the software code, process steps of the image processing method are performed to obtain an image having a high definition. The internal memory 121 may further store a photographed image.

Certainly, the software code of the image processing method provided in the embodiments of this application may alternatively be stored in an external memory. The processor 110 may run the software code through the external memory interface 120 to perform process steps of the image processing method to obtain an image having a high definition and a strong contrast. The image captured by the electronic device 100 may also be stored in the external memory.

It should be understood that the user may specify whether to store the images in the internal memory 121 or the external memory. For example, when the electronic device 100 is currently connected to the external memory, if the electronic device 100 photograph 1 frame of image, prompt information may be popped up to prompt the user whether to store the image in the external memory or the internal memory. Certainly, other specifying manners are also available, on which no limitation is made in this embodiment of this application. Alternatively, when the electronic device 100 detects that a memory amount of the internal memory 121 is less than a preset amount, the image may be automatically stored in the external memory.

The electronic device 100 may implement an audio function such as music playing or recording by using the audio module 170, the loudspeaker 170A, the receiver 170B, the microphone 170C, the headset jack 170D, the application processor, and the like. The audio function includes, for example, music playing and sound recording.

It may be understood that an example structure in this embodiment of this application does not constitute a specific limitation on the electronic device 100. In some other embodiments of this application, the electronic device 100 may include more or fewer components than those shown in the figure, or some components may be combined, or some components may be divided, or different component arrangements may be used. The components in the portrait may be implemented by hardware, software, or a combination of software and hardware.

The hardware system of the electronic device 100 is described in detail above, and a software system of the electronic device 100 is described below. A software system may use a layered architecture, an event-driven architecture, a microkernel architecture, a microservice architecture, or a cloud architecture. In the embodiments of this application, the layered architecture is used as an example to describe the software system of the electronic device 100.

Figure 15:
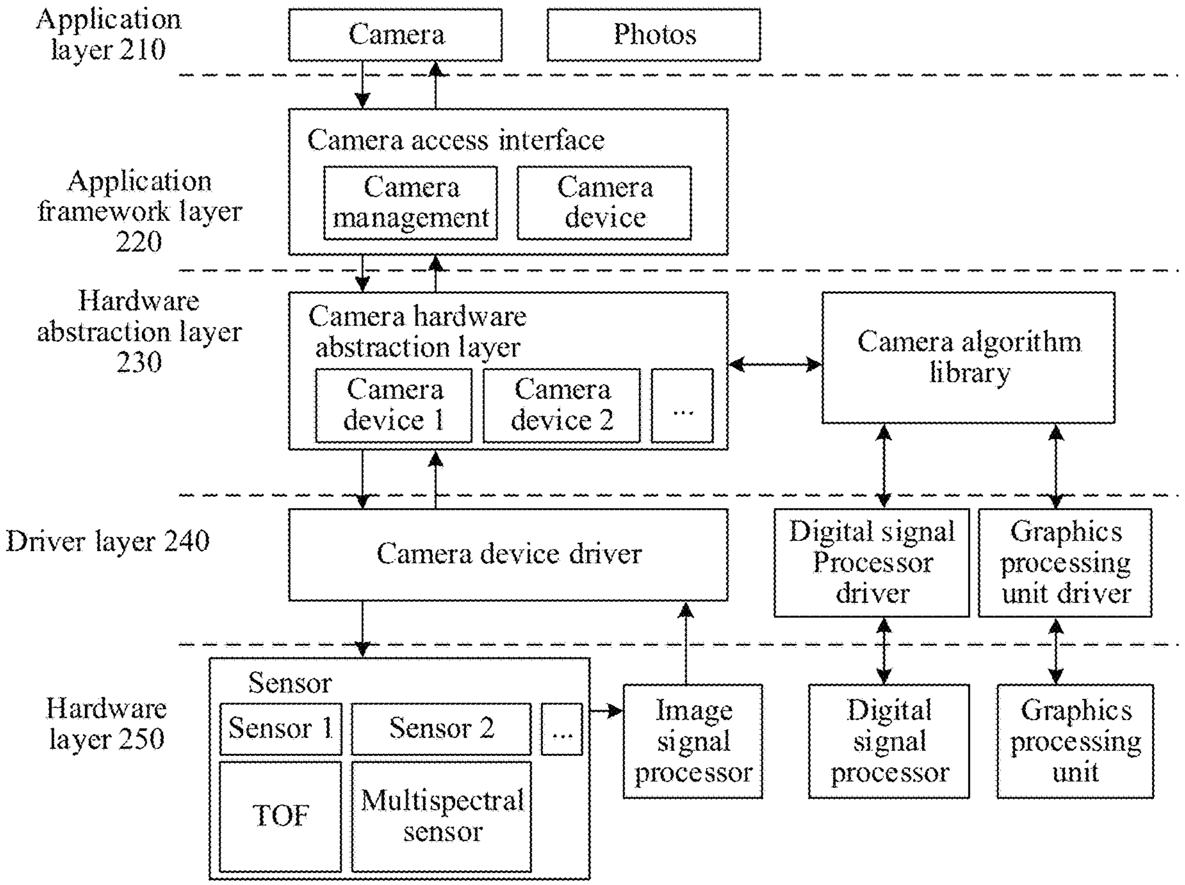
FIG. 15 is a schematic diagram of a software structure of an electronic device according to an embodiment of this application.

As shown in FIG. 15, the software system using a layered architecture is divided into several layers, and each layer has a clear role and task. The layers communicate with each other through a software interface. In some embodiments, the system is divided into five layers, which respectively are an application layer 210, an application framework layer 220, a hardware abstraction layer 230, a driver layer 240, and a hardware layer 250 from top to bottom.

The application layer 210 may include a camera and a photo application, and may further include applications such as calendar, phone, map, navigation, WLAN, Bluetooth, music, video, and messages.

The application framework layer 220 provides application access interfaces and programming frameworks for applications of the application layer 210.

For example, the application frame layer 220 includes a camera access interface. The camera access interface is configured to provide a camera photographing service through a camera management and a camera device.

The camera management in the application frame layer 220 is configured to manage the camera. The camera management can obtain parameters of the camera, such as determining an operating state of the camera.

The camera device in the application framework layer 220 is configured to provide a data access interface between the camera device and the camera management.

The hardware abstraction layer 230 is configured to perform hardware abstraction. For example, the hardware abstraction layer 230 may include a camera hardware abstraction layer and another hardware device abstraction layer. The camera hardware abstraction layer may include a camera device 1, a camera device 2, and the like. The camera hardware abstraction layer may be connected to a camera algorithm library, and the camera hardware abstraction layer may invoke an algorithm in a camera algorithm library.

The driver layer 240 is configured to provide a driver for different hardware devices. For example, the driver layer may include a camera driver, a digital signal processor driver, and a graphics processing unit driver.

The hardware layer 250 may include a sensor, an image signal processor, a digital signal processor, a graphics processing unit, and another hardware device. The sensor may include a sensor 1, a sensor 2, and the like, and may further include a time of flight (time of flight, TOF), a multi-spectral sensor, and the like.

The following exemplarily describes a working procedure of a software system of the electronic device 100 with reference to the display of a photographing scene.

When the user performs the click operation on the touch sensor 180K, after the camera APP is awakened by the click operation, each camera device of the camera hardware abstraction layer is invoked through the camera access interface. For example, the camera hardware abstraction layer determines that a current zoom multiple is between a zoom multiple range of [0.6, 0.9]. In this way, the wide-angle camera can be invoked by issuing an instruction to the camera device driver, and the camera algorithm library starts to load the algorithm in the target light filling model utilized in the embodiment of this application.

When the sensor of the hardware layer is invoked, for example, after invoking the sensor 1 in the wide-angle camera to obtain the original image, the original image is transmitted to the image signal processing for preliminary processing such as registration. After processing, the camera device drives back to the hardware abstraction layer, and then uses the algorithms in the loaded camera algorithm library for processing, such as using the target light filling model, and processes based on the relevant processing steps provided in this embodiment of this application to obtain the captured image. The target light filling model can be driven and invoked by the digital signal processing unit and the graphics processing unit for processing.

The obtained captured image is transmitted back to the camera application for display and storage through the camera hardware abstraction layer and the camera access interface.

Figure 16:
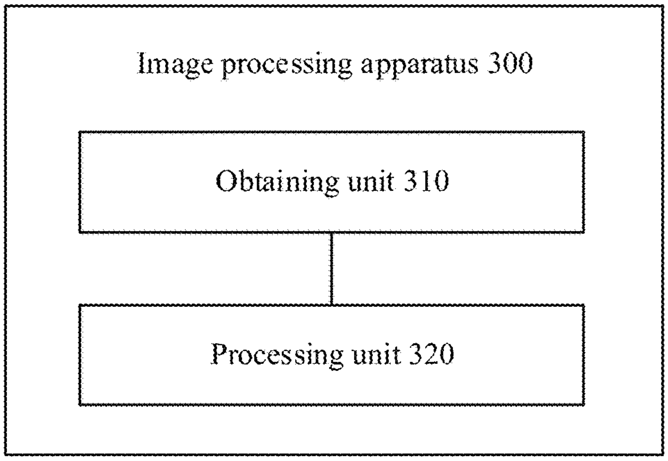
FIG. 16 is a schematic structural diagram of an image processing apparatus according to an embodiment of this application.

FIG. 16 is a schematic diagram of an image processing apparatus according to an embodiment of this application.

It should be understood that the image processing apparatus 300 may perform the image processing method shown in FIG. 9. The image processing apparatus 300 includes an obtaining unit 310 and a processing unit 320. It should also be understood that the target light filling model may be deployed in the image processing apparatus 300.

The obtaining unit 310 is configured to detect a first operation of the first control performed on the first interface by a user.

The processing unit 320 is configured to instruct the camera to collect the original image in response to the first operation.

The processing unit 320 is further configured to input the original image into the target light filling model for processing, to obtain the captured image.

It should be noted that the image processing apparatus 300 is embodied in a form of a functional unit. The term "unit" herein may be implemented in a form of software and/or hardware, which is not specifically limited.

For example, "unit" may be a software program, a hardware circuit, or a combination of both to realize the foregoing functions. The hardware circuit may include an application specific integrated circuit (application specific integrated circuit, ASIC), an electronic circuit, a processor (for example, a shared processor, a dedicated processor, or a packet processor) configured to execute one or more software or firmware programs, a memory, a combined logical circuit, and/or another suitable component that supports the described functions.

Therefore, the units in the examples described in reference to the embodiments of this application can be implemented by electronic hardware or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

An embodiment of this application further provides a computer-readable storage medium. The computer-readable storage medium stores computer instructions. When the computer-readable storage medium is run on an image processing apparatus, the image processing apparatus is enabled to perform the method shown in FIG. 9. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium, or a semiconductor medium (for example, a solid state disk (solid state disk, SSD)), or the like.

An embodiment of this application further provides a computer program product including computer instructions. When the computer program product is run on an image processing apparatus, the image processing apparatus is enabled to perform the method as shown in FIG. 9.

Figure 17:
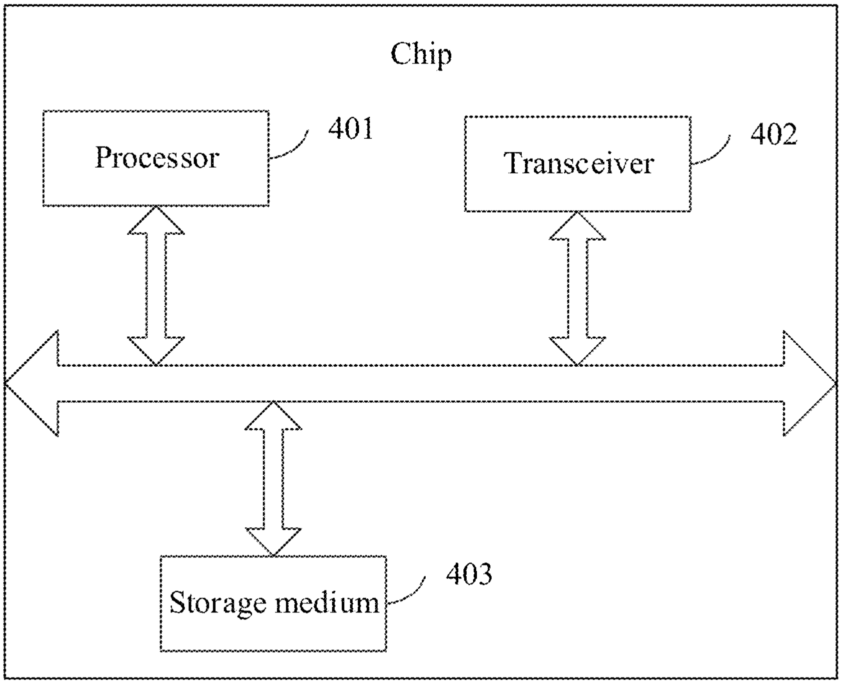
FIG. 17 is a structural schematic diagram of a chip according to an embodiment of this application.

FIG. 17 is a structural schematic diagram of a chip according to an embodiment of this application. The chip shown in FIG. 16 may be a general-purpose processor and may also be a special-purpose processor. The chip includes a processor 401. The processor 401 is configured to support the image processing apparatus 300 to execute the foregoing technical solutions as shown in FIG. 13.

Optionally, the chip further includes a transceiver 402. The transceiver 402 is configured to receive control of the processor 401, and is configured to support the image processing apparatus 300 in executing the foregoing technical solutions as shown in FIG. 13.

Optionally, the chip shown in FIG. 17 may further include a storage medium 403.

It should be noted that the chip shown in FIG. 17 may be implemented by using the following circuits or devices: one or more field programmable gate arrays (field programmable gate array, FPGA), a programmable logic device (programmable logic device, PLD), a controller, a state machine, a gate logic, a discrete hardware component, any other suitable circuit, or any combination of circuits that can perform various functions described in the full text of this application.

The electronic device, the image processing apparatus, the computer storage medium, the computer program product, and the chip provided in the embodiments of this application are all configured to perform the method provided above, and thus, achieved beneficial effects may be obtained with reference to the beneficial effects corresponding to the method provided above. Details are not described herein again.

It should be understood that the foregoing descriptions are intended to help a person skilled in the art to better understand the embodiments of this application, but not to limit the scope of the embodiments of this application. People skilled in the art obviously may perform various equivalent modifications or changes according to the given examples, for example, some steps in various embodiments of a detection method may be unnecessary or some steps may be newly added. Or any two or more above embodiments may be combined. A modified, changed, or combined scheme may also fall within the scope of the embodiment of this application.

It should be understood that the foregoing descriptions of the embodiments of this application emphasize differences between the embodiments. For the same or similar description not mentioned, reference may be made to each other. For brevity, details are not described in this specification.

It should be understood that sequence numbers of the foregoing processes do not indicate an execution sequence, and an execution sequence of processes shall be determined based on functions and internal logic thereof, and shall constitute no limitation on an implementation process of the embodiments of this application.

It should be understood that in the embodiment of this application, "preset" and "pre-define" may be realized by pre-storing corresponding codes and tables in the device (such as the electronic device) or through other manners used for indicating related information, and this application does not limit a specific implementation.

It should be understood that division of manners, situations, categories, and embodiments in the embodiment of this application merely aims to facilitate description rather than constitute specific limitations, and characteristics in various manners, categories, situations, and embodiments may be combined without contradictions.

It should be understood that in the embodiments of this application, unless otherwise specified and there is a logical conflict, terms and/or descriptions in different embodiments are consistent and may be referenced by each other. Technical features in different embodiments may be combined based on an internal logical relationship thereof to form a new embodiment.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be used as protection scope of the claims.

What is claimed is:

1. An image processing method, comprising:

displaying a first interface, wherein the first interface comprises a first control;

detecting a first operation performed on the first control;

obtaining an original image in response to the first operation; and processing the original image by using a target light filling model to obtain a captured image, wherein the target light filling model is obtained by training an initial light filling model using:

an albedo portrait training image and a normal portrait training image obtained based on a refined matte portrait training image and a plurality of frames of OLAT (one light at a time) training images, and to-be-light-filled composite rendered images and light-filled composite rendered image obtained based on the refined matte portrait training image, the plurality of frames of OLAT training images, and a panoramic environment image, and wherein the target light filling model is configured to fill light for a person and an environment in the original image.

2. The method according to claim 1, wherein the target light filling model comprises a target inverse rendering sub-model, a to-be-light-filled position estimation module, and a target light filling control sub-model, wherein the target inverse rendering sub-model is connected to the to-be-light-filled position estimation module and the target light filling control sub-model, and the to-be-light-filled position estimation module is connected to the target light filling control sub-model; and the processing the original image by using a target light filling model to obtain a captured image comprises:

inputting the original image into the target inverse rendering sub-model to obtain an albedo image, a normal image, and an environment image corresponding to the original image, wherein the target inverse rendering sub-model is configured to disassemble the person and the environment in the original image, the albedo image is used to represent an albedo characteristic corresponding to the person in the original image, the normal image is used to represent a normal characteristic corresponding to the person in the original image, and an environmental image is used to represent an environmental content other than the person in the original image;

inputting the original image and the environmental image into the to-be-light-filled position estimation module to obtain a light-filled environment image, wherein the to-be-light-filled position estimation module is configured to determine a light filling position in the environmental image based on the original image and fill the light filling position with light; and inputting the albedo image, the normal image, and the light-filled environment image into the target light filling control sub-model to obtain the captured image, wherein the target light filling control sub-model is configured to fill the person with light based on the light-filled environment image by using the albedo image and the normal image.

3. The method according to claim 1, wherein obtaining the initial light filling model comprises:

obtaining a plurality of frames of initial portrait training images and the panoramic environment image;

performing first processing on the plurality of frames of initial portrait training images to obtain the refined matte portrait training image and the plurality of frames of OLAT (one light at a time) training images;

performing second processing on the refined matte portrait training image and the plurality of frames of OLAT training images to obtain the albedo portrait training image and the normal portrait training image;

performing third processing on the refined matte portrait training image, the plurality of frames of OLAT training images, and a panoramic environment image to obtain a to-be-light-filled composite rendered image and a light-filled composite rendered image; and training the initial light filling model by using the albedo portrait training image, the normal portrait training image, the to-be-light-filled composite rendered image, and the light-filled composite rendered image, to obtain the target light filling model, wherein the initial light filling model comprises an initial inverse rendering sub-model, an initial to-be-light-filled position estimation module, and an initial light filling control sub-model, a target inverse rendering sub-model is a trained initial inverse rendering sub-model, a target light filling control sub-model is a trained initial light filling control sub-model, and the to-be-light-filled position estimation module is a trained initial to-be-light-filled position estimation module.

4. The method according to claim 3, wherein the performing first processing on the plurality of frames of initial portrait training images to obtain a refined matte portrait training image and a plurality of frames of OLAT training images comprises:

registering a plurality of frames of normal portrait training images with a fully lit portrait training image respectively to obtain the plurality of frames of OLAT training images, wherein the plurality of frames of initial portrait training images comprise the plurality of frames of normal portrait training images, the fully lit portrait training image, a matte portrait training image, and an empty portrait training image;

registering the matte portrait training image with the fully lit portrait training image to obtain a registered matte portrait training image; and dividing the registered matte portrait training image by the empty portrait training image to obtain the refined matte portrait training image.

5. The method according to claim 3, wherein the performing second processing on the refined matte portrait training image and the plurality of frames of OLAT training images to obtain an albedo portrait training image and a normal portrait training image comprises:

multiplying the plurality of frames of OLAT training images by the refined matte portrait training image respectively to obtain a plurality of frames of OLAT intermediate images; and determining, based on the plurality of frames of OLAT intermediate images, the albedo portrait training image and the normal portrait training image by using a photometric stereo formula.

6. The method according to claim 3, wherein the performing third processing on the refined matte portrait training image, the plurality of frames of OLAT training images, and the panoramic environment image to obtain a to-be-light-filled composite rendered image comprises:

determining an annotated panoramic environment image based on the plurality of frames of OLAT training images and the panoramic environment image, wherein the annotated panoramic environment image is annotated with a position of a light source corresponding to each of the plurality of frames of OLAT training images;

dividing the annotated panoramic environment image into regions based on the position of the light source by using a delaunay algorithm;

determining a weight corresponding to each region in the annotated panoramic environment image;

determining a to-be-light-filled portrait rendering image based on the plurality of frames of OLAT training images and the weight corresponding to each region in the annotated panoramic environment image; and obtaining the to-be-light-filled composite rendered image based on the panoramic environment image and the to-be-light-filled portrait rendering image.

7. The method according to claim 6, wherein the determining an annotated panoramic environment image based on the plurality of frames of OLAT training images and the panoramic environment image comprises:

determining rectangular coordinates of the light source corresponding to each frame of OLAT training image based on the plurality of frames of OLAT training images;

converting the rectangular coordinates of the light source into polar coordinates; and annotating the position of the light source on the panoramic environment image based on the polar coordinates corresponding to the light source, to obtain the annotated panoramic environment image.

8. The method according to claim 6, wherein the determining the to-be-light-filled portrait rendering image based on the plurality of frames of OLAT training images and the weight corresponding to each region in the annotated panoramic environment image comprises:

multiplying the plurality of frames of OLAT training images by the refined matte portrait training image respectively to obtain a plurality of frames of OLAT intermediate images; and calculating a weighted sum of the plurality of frames of OLAT intermediate images by using the weight corresponding to each region in the annotated panoramic environment image, to obtain the to-be-light-filled portrait rendering image.

9. The method according to claim 6, wherein the obtaining the to-be-light-filled composite rendered image based on the panoramic environment image and the to-be-light-filled portrait rendering image comprises:

cropping the panoramic environment image to obtain a local environment image; and compositing the to-be-light-filled portrait rendering image and the local environment image to obtain the to-be-light-filled composite rendered image.

10. The method according to claim 3, wherein the performing third processing on the refined matte portrait training image, the plurality of frames of OLAT training images, and the panoramic environment image to obtain a light-filled composite rendered image comprises:

determining a panoramic light-filled environment image based on the panoramic environment image;

determining an annotated panoramic light-filled environment image based on the plurality of frames of OLAT training images and the panoramic light-filled environment image, wherein the annotated panoramic light-filled environment image is annotated with a position of a light source corresponding to each of the plurality of frames of OLAT training images;

dividing the annotated panoramic light-filled environment image into regions based on the position of the light source by using a delaunay algorithm;

determining a weight corresponding to each region in the annotated panoramic light-filled environment image;

determining a light-filled portrait rendering image based on the plurality of frames of OLAT training images and the weight corresponding to each region in the annotated panoramic light-filled environment image; and obtaining the light-filled composite rendered image based on the panoramic light-filled environment image and the light-filled portrait rendering image.

11. The method according to claim 10, wherein the determining a panoramic light-filled environment image based on the panoramic environment image comprises:

obtaining a panoramic light-filled image; and superimposing the panoramic light-filled image and the panoramic environment image to obtain the panoramic light-filled environment image.

12. The method according to claim 10, wherein the determining an annotated panoramic light-filled environment image based on the plurality of frames of OLAT training images and the panoramic light-filled environment image comprises:

determining rectangular coordinates of the light source corresponding to each frame of OLAT training image based on the plurality of frames of OLAT training images;

converting the rectangular coordinates of the light source into polar coordinates; and annotating the position of the light source on the panoramic light-filled environment image based on the polar coordinates corresponding to the light source, to obtain the annotated panoramic light-filled environment image.

13. The method according to claim 10, wherein the determining the light-filled portrait rendering image based on the plurality of frames of OLAT training images and the weight corresponding to each region in the annotated panoramic environment image comprises:

multiplying the plurality of frames of OLAT training images by the refined matte portrait training image respectively to obtain a plurality of frames of OLAT intermediate images; and calculating a weighted sum of the plurality of frames of OLAT intermediate images by using the weight corresponding to each region in the annotated panoramic light-filled environment image, to obtain the light-filled portrait rendering image.

14. The method according to claim 10, wherein the obtaining the light-filled composite rendered image based on the panoramic light-filled environment image and the light-filled portrait rendering image comprises:

cropping the panoramic light-filled environment image to obtain a local light-filled environment image; and compositing the light-filled portrait rendering image and the local light-filled environment image to obtain the light-filled composite rendered image.

15. The method according to claim 9, wherein the training an initial light filling model by using the albedo portrait training image, the normal portrait training image, the to-be-light-filled composite rendered image, and the light-filled composite rendered image, to obtain a target light filling model comprises:

inputting the to-be-light-filled composite rendered image into the initial inverse rendering sub-model to obtain a first output image, a second output image, and a third output image;

comparing the first output image with the albedo portrait training image, comparing the second output image with the normal portrait training image, and comparing the third output image with the local environment image; and using a trained initial inverse rendering sub-model as the target inverse rendering sub-model if the first output image is similar to the albedo portrait training image, the second output image is similar to the normal portrait training image, and the third output image is similar to the local environment image.

16. The method according to claim 14, further comprising:

inputting the albedo portrait training image, the normal portrait training image, the local light-filled environment image, and the to-be-light-filled composite rendered image into the initial light filling control sub-model, to obtain a fourth output image;

comparing the fourth output image with the light-filled composite rendered image; and using a trained initial light filling control sub-model as the target light filling control sub-model if the fourth output image is similar to the light-filled composite rendered image.

17. The method according to claim 16, wherein the inputting the albedo portrait training image, the normal portrait training image, the local light-filled environment image, and the to-be-light-filled composite rendered image into the initial light filling control sub-model, to obtain a fourth output image comprises:

obtaining a light and shadow training image based on the normal portrait training image and the local light-filled environment image;

multiplying the to-be-light-filled composite rendered image by the refined matte portrait training image to obtain a to-be-light-filled composite intermediate image; and inputting the albedo portrait training image, the normal portrait training image, the light and shadow training image, and the to-be-light-filled composite intermediate image into the initial light filling control sub-model to obtain the fourth output image.

18. An electronic device, comprising a processor and a memory, wherein the memory is configured to store a computer program executable on the processor; and the processor invokes computer instructions to cause the electronic device to:

display a first interface, wherein the first interface comprises a first control;

detect a first operation performed on the first control;

obtain an original image in response to the first operation;

process the original image by using a target light filling model to obtain a captured image, wherein the target light filling model is obtained by training an initial light filling model using:

an albedo portrait training image and a normal portrait training image obtained based on a refined matte portrait training image and a plurality of frames of OLAT (one light at a time) training images, and to-be-light-filled composite rendered images and light-filled composite rendered image obtained based on the refined matte portrait training image, the plurality of frames of OLAT training images, and a panoramic environment image, and wherein the target light filling model is configured to fill light for a person and an environment in the original image.

19. The electronic device, according to claim 18, wherein the target light filling model comprises a target inverse rendering sub-model, a to-be-light-filled position estimation module, and a target light filling control sub-model, wherein the target inverse rendering sub-model is connected to the to-be-light-filled position estimation module and the target light filling control sub-model, and the to-be-light-filled position estimation module is connected to the target light filling control sub-model; and the process the original image by using a target light filling model to obtain a captured image comprises:

input the original image into the target inverse rendering sub-model to obtain an albedo image, a normal image, and an environment image corresponding to the original image, wherein the target inverse rendering sub-model is configured to disassemble the person and the environment in the original image, the albedo image is used to represent an albedo characteristic corresponding to the person in the original image, the normal image is used to represent a normal characteristic corresponding to the person in the original image, and an environmental image is used to represent an environmental content other than the person in the original image;

input the original image and the environmental image into the to-be-light-filled position estimation module to obtain a light-filled environment image, wherein the to-be-light-filled position estimation module is configured to determine a light filling position in the environmental image based on the original image and fill the light filling position with light; and input the albedo image, the normal image, and the light-filled environment image into the target light filling control sub-model to obtain the captured image, wherein the target light filling control sub-model is configured to fill the person with light based on the light-filled environment image by using the albedo image and the normal image.

20. A chip, comprising: a processor, configured to invoke a computer program from a memory and run the computer program, so that a device equipped with the chip performs is enabled to:

display a first interface, wherein the first interface comprises a first control;

detect a first operation performed on the first control;

obtain an original image in response to the first operation; and process the original image by using a target light filling model to obtain a captured image, wherein the target light filling model is obtained by training an initial light filling model using:

an albedo portrait training image and a normal portrait training image obtained based on a refined matte portrait training image and a plurality of frames of OLAT (one light at a time) training images, and to-be-light-filled composite rendered images and light-filled composite rendered image obtained based on the refined matte portrait training image, the plurality of frames of OLAT training images, and a panoramic environment image, and wherein the target light filling model is configured to fill light for a person and an environment in the original image.

* * * * *